(12) United States Patent
Smith et al.

(10) Patent No.: US 9,045,178 B2
(45) Date of Patent: Jun. 2, 2015

(54) ROTATION DEVICE FOR LOAD TRANSPORTING APPARATUS

(71) Applicant: Entro Industries, Inc., Hillsboro, OR (US)

(72) Inventors: Shawn R. Smith, Hillsboro, OR (US); Harlan B. Smith, Hillsboro, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 0 days.

(21) Appl. No.: 14/028,111

(22) Filed: Sep. 16, 2013

(65) Prior Publication Data

US 2014/0161581 A1 Jun. 12, 2014

Related U.S. Application Data

(63) Continuation of application No. 13/711,193, filed on Dec. 11, 2012, now Pat. No. 8,573,334.

(60) Provisional application No. 61/576,657, filed on Dec. 16, 2011.

(51) Int. Cl.
*B62D 57/02* (2006.01)
*B62D 57/032* (2006.01)
*E21B 15/00* (2006.01)

(52) U.S. Cl.
CPC .............. *B62D 57/032* (2013.01); *B62D 57/02* (2013.01); *E21B 15/003* (2013.01)

(58) Field of Classification Search
CPC .............................. B62D 57/02; B62D 57/032
USPC .................................................... 180/8.1, 8.6
See application file for complete search history.

(56) References Cited

U.S. PATENT DOCUMENTS

| | | |
|---|---|---|
| 2,259,200 A | 10/1941 | Cameron et al. |
| 2,290,118 A | 7/1942 | Page |
| 2,914,127 A | 8/1955 | Ricourd |
| 2,777,528 A | 1/1957 | Jourdain |
| 2,942,676 A | 6/1960 | Kraus |
| 3,113,661 A | 12/1963 | Linke et al. |
| 3,135,345 A | 6/1964 | Scruggs |
| 3,249,168 A | 5/1966 | Klein |

(Continued)

FOREIGN PATENT DOCUMENTS

| | | |
|---|---|---|
| CH | 359422 | 5/1958 |
| DE | 2418411 | 10/1975 |

(Continued)

OTHER PUBLICATIONS

Stolowitz Ford Cowger LLP, "Listing of Related Cases", Sep. 16, 2013, 1 page.

*Primary Examiner* — Kevin Hurley
*Assistant Examiner* — Michael Stabley
(74) *Attorney, Agent, or Firm* — Stolowitz Ford Cowger LLP

(57) ABSTRACT

Embodiments of the present invention are directed to a load transporting apparatus that is capable of being steered while transporting a load across a base surface. In particular, the load transporting apparatus includes a roller track configured to support movement of a roller assembly, and a support foot that is connected to the roller track with a pin connector. During load transport, the support foot can be maintained in a substantially similar position relative to a frame structure supporting the load even when the transport movement is not in a parallel direction to the orientation of the support foot.

22 Claims, 22 Drawing Sheets

(56) References Cited

U.S. PATENT DOCUMENTS

| | | | |
|---|---|---|---|
| 3,255,836 A | 6/1966 | Hoppmann et al. | |
| 3,446,301 A | 5/1969 | Thomas | |
| 3,512,597 A | 5/1970 | Baron | |
| 3,528,341 A | 9/1970 | Rieschel | |
| 3,576,225 A | 4/1971 | Chambers | |
| 3,638,747 A | 2/1972 | Althoff | |
| 3,807,519 A | 4/1974 | Patch | |
| 3,853,196 A | 12/1974 | Guest | |
| 3,866,425 A * | 2/1975 | Morrice | 405/274 |
| 3,921,739 A | 11/1975 | Rich et al. | |
| 4,014,399 A | 3/1977 | Ruder | |
| 5,492,436 A | 2/1996 | Suksumake | |
| 5,921,336 A | 7/1999 | Reed | |
| 6,202,774 B1 | 3/2001 | Claassen et al. | |
| 6,203,247 B1 * | 3/2001 | Schellstede et al. | 405/196 |
| 6,581,525 B2 | 6/2003 | Smith | |
| 6,612,781 B1 | 9/2003 | Jackson | |
| 7,681,674 B1 | 3/2010 | Barnes et al. | |
| 7,806,207 B1 | 10/2010 | Barnes et al. | |
| 7,819,209 B1 | 10/2010 | Bezner | |
| 7,882,915 B1 | 2/2011 | Wishart | |
| 8,051,930 B1 | 11/2011 | Barnes et al. | |
| 8,490,724 B2 | 7/2013 | Smith et al. | |
| 8,490,727 B2 | 7/2013 | Smith et al. | |
| 8,561,733 B2 | 10/2013 | Smith et al. | |
| 8,573,334 B2 | 11/2013 | Smith | |
| 8,646,976 B2 * | 2/2014 | Stoik et al. | 384/36 |
| 8,839,892 B2 | 9/2014 | Smith et al. | |
| 2013/0156538 A1 | 6/2013 | Smith et al. | |
| 2013/0156539 A1 | 6/2013 | Smith et al. | |
| 2013/0277124 A1 | 10/2013 | Smith et al. | |
| 2014/0014417 A1 | 1/2014 | Smith et al. | |
| 2014/0054097 A1 | 2/2014 | Bryant | |

FOREIGN PATENT DOCUMENTS

| | | |
|---|---|---|
| EP | 469182 | 10/1990 |
| GB | 2315464 | 2/1998 |
| WO | 2004103807 | 12/2004 |
| WO | 2010136713 | 12/2010 |

* cited by examiner

ROTATION DEVICE FOR LOAD TRANSPORTING APPARATUS

RELATED APPLICATIONS

This application is a continuation of U.S. patent application Ser. No. 13/711,193, filed Dec. 11, 2012, now U.S. Pat. No. 8,573,334, issued Nov. 5, 2013, entitled ROTATION DEVICE FOR LOAD TRANSPORTING APPARATUS, which claims priority to U.S. Provisional Application No. 61/576,657, filed Dec. 16, 2011, entitled METHOD AND APPARATUS FOR TRANSPORTING A LOAD, the contents of which are hereby incorporated by reference. This application is related to U.S. patent application Ser. No. 13/711,269, filed Dec. 11, 2012, now U.S. Pat. No. 8,561,733, issued Oct. 22, 2013, entitled ALIGNMENT RESTORATION DEVICE FOR LOAD TRANSPORTING APPARATUS, the contents of which are hereby incorporated by reference. This application is also related to U.S. patent application Ser. No. 13/711,315, filed Dec. 11, 2012, now U.S. Pat. No. 8,490,724, issued Jul. 23, 2013, entitled CENTERING DEVICE FOR LOAD TRANSPORTING APPARATUS, the contents of which are hereby incorporated by reference.

FIELD OF THE INVENTION

This disclosure relates generally to apparatuses for transporting a load, and more particularly to apparatuses for moving heavy loads over small distances with the ability to fine tune the resultant position of the heavy load.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled pipes in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Reed and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, this disclosed system in the '525 patent does not allow for movement of heavy load in a direction perpendicular to the long axis of the support beams. That is, movement of the heavy load is restricted in the walking device disclosed in the '525 patent to only particular directions, which can make fine tuning of the position of the heavy load difficult.

SUMMARY

Embodiments of the invention are directed to apparatuses for transporting loads, where the apparatuses are structured to steer the loads in order to efficiently move the loads between set positions. In some embodiments, a load transporting apparatus that is capable of being steered while transporting a load across a base surface is provided. In these embodiments, the load transporting apparatus includes a roller track configured to support movement of a roller assembly, and a support foot that is connected to the roller track with a pin connector. During load transport, the support foot can be maintained in a substantially similar position relative to a frame structure supporting the load even when the transport movement is not in a parallel direction to the orientation of the support foot.

DETAILED DESCRIPTION

As described above, walkers, or walking machines, are vehicles that are used for transporting very heavy loads, such as entire oil well drilling rigs. Such loads may be as great as several thousand tons and may be required to be sequentially positioned very precisely over spaced-apart well bores, for example. Embodiments of the present concept are directed to load transporting apparatuses, such as walking machines, for moving heavy loads over small distances with the ability to fine tune the resultant position of the heavy load. For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
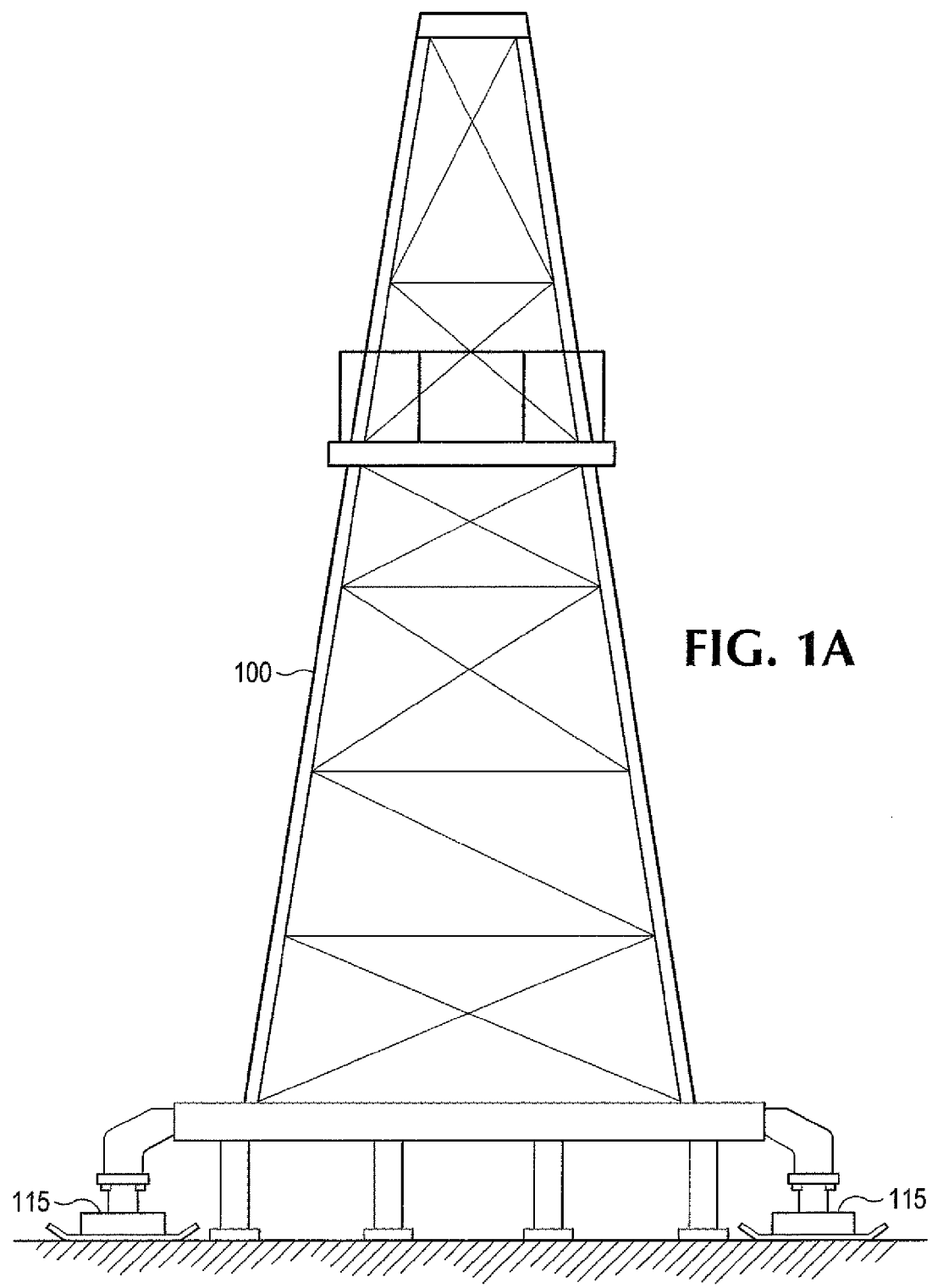
FIGS. 1A and 1B are diagrams of walking apparatuses attached to various loads according to embodiments of the invention.
Figure 1B:
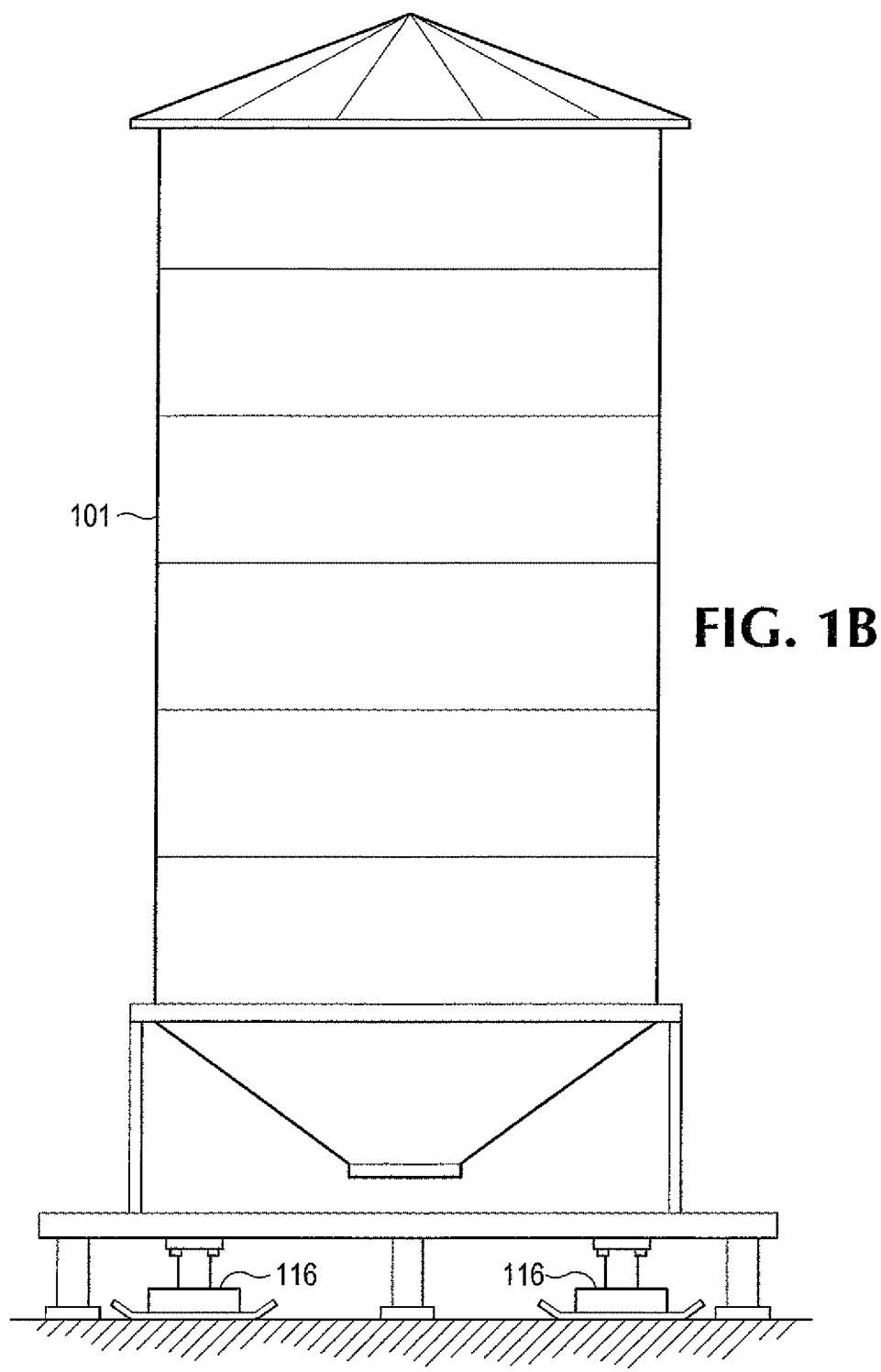

For example, with reference FIGS. 1A and 1B, a load transporting system includes multiple walking machines that support a load being carried by the load transporting system. FIGS. 1A and 1B show examples of walking apparatuses attached to various loads according to embodiments of the invention. Referring to FIG. 1A, multiple walking apparatuses 115 are positioned under or adjacent to an oil rig 100. Typically, walking machines 115 are positioned at least near edge portions of a load 100 to balance the weight of the load over the various walking machines. However, specific situations may dictate that walking machines 115 are positioned in various other locations relative to the load 100.

Referring to FIG. 1B, multiple walking apparatuses 116 are positioned under or adjacent to a silo 101. Although an oil rig load 100 and a silo 101 are respectively illustrated in FIGS. 1A and 1B, walking machines may be used to move any type of relatively large load, such as bridge sections, ship sections, structures, etc. Additionally, although two walking machines are shown in FIGS. 1A and 1B, more or fewer walking machines may be used to move loads 100, 101.

Figure 2A:
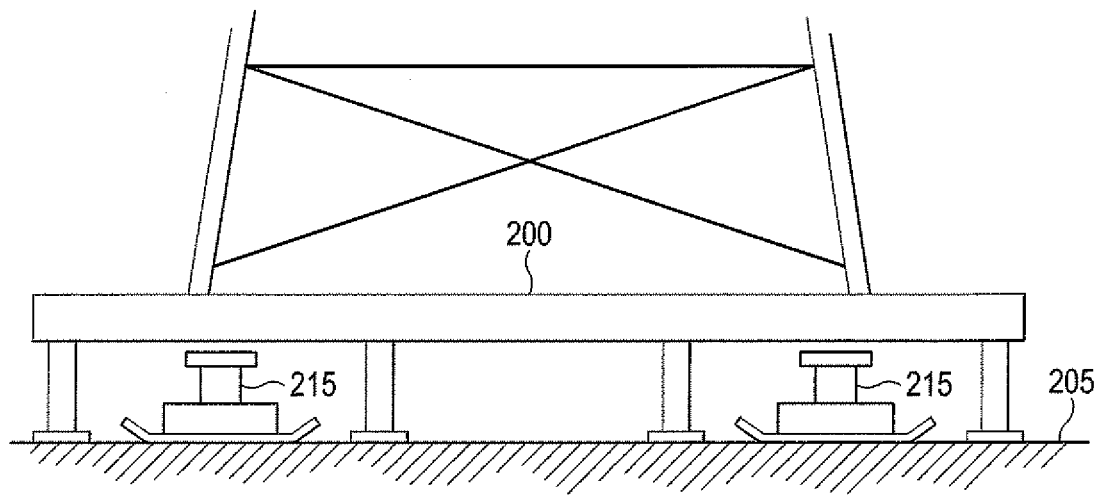
FIGS. 2A, 2B, 2C, 2D, 2E, and 2F are detail diagrams showing an example operational progression of walking apparatuses to move a load according to embodiments of the invention.
Figure 2B:
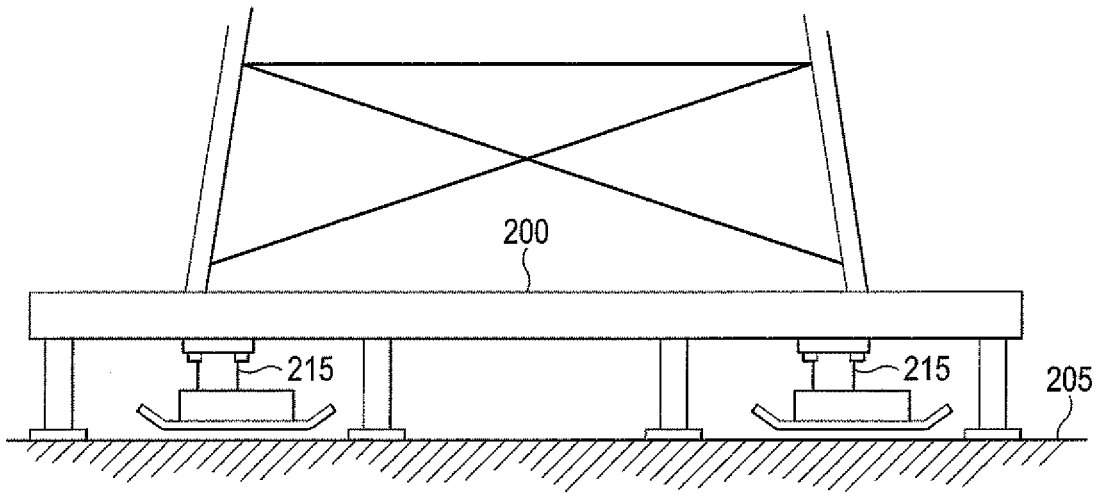
Figure 2C:
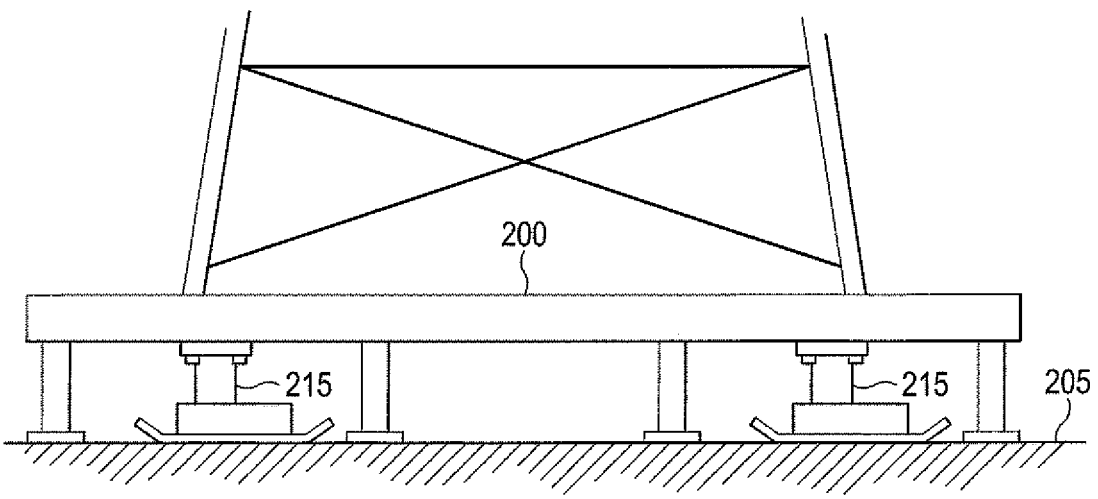

FIGS. 2A-2F provide an overview of an example operation of walking apparatuses to move a load according to embodiments of the invention. Referring to FIG. 2A, walking apparatuses 215 are positioned on a base surface 205 below or adjacent to a load 200. Referring to FIG. 2B, the walking apparatuses 215 are attached to the load 200, and are positioned above a base surface 205. As described below, there are many possible connection variations that can be used to connect the walking apparatuses to a load 200. Referring to FIG. 2C, the walking apparatuses 215 are operated so that a foot portion of the walking apparatus contacts the base surface 205. The walking apparatuses 215 may be operated substantially simultaneously, or may be operated in intervals depending on the conditions of the base surface 205 and the load 200 that is to be moved.

Figure 2D:
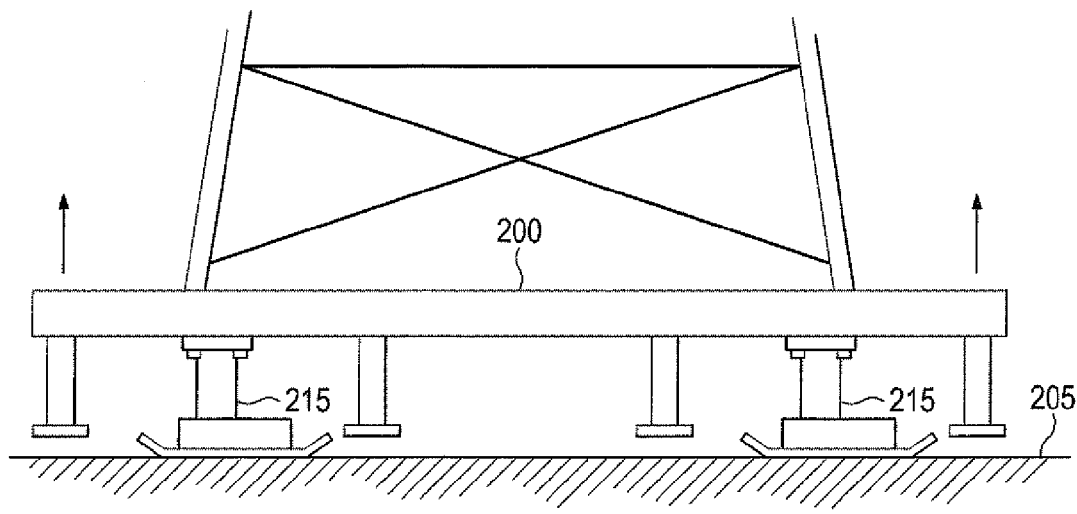

Referring to FIG. 2D, the walking apparatuses 215 are operated to lift the load 200 above the base surface 205. The walking apparatuses 215 may again be operated substantially simultaneously to lift the load 200, or may be operated in intervals depending on the conditions associated with the desired move.

Figure 2E:
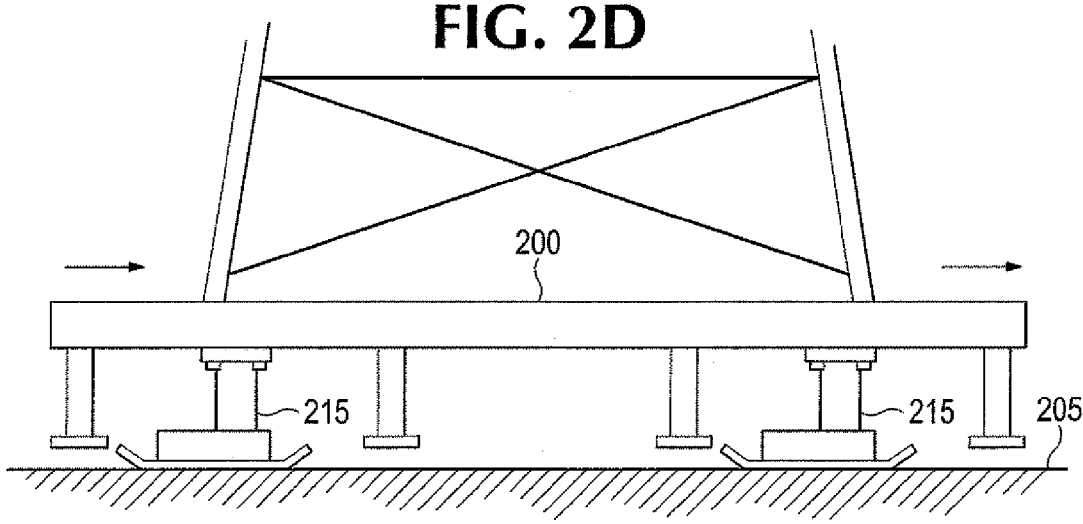
Figure 2F:
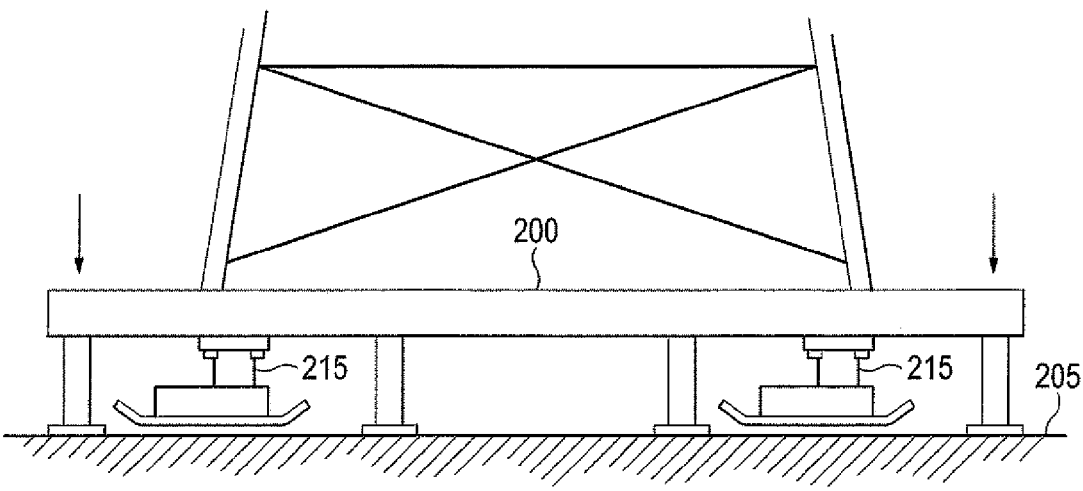

Referring to FIG. 2E, the walking apparatuses 215 are operated to move the load 200 to the right. Although FIG. 2E shows the load 200 being moved to the right, the walking apparatuses can be operated to move the load in a variety of directions depending on the desired final location of the load. Referring to FIG. 2F, the walking apparatuses 215 are operated to lower the load 200 to the base surface 205 and to raise the foot portions of the walking apparatuses above the base surface. That is, after the load 200 is positioned on the base surface 205, the walking apparatuses 215 are further operated so that they are raised above the base surface. Here, the connection between the walking apparatuses 215 and the load 200 support the walking apparatuses 215 when they are raised above the base surface 205. After the walking apparatuses 215 are raised above the base surface 205, they are further operated to be repositioned for another movement walking step, such as by moving the foot portions of the walking apparatuses to the right so that they are in a position as shown in FIG. 2B. That is, the base surface touching part of the walking apparatuses 215 (e.g., the support foot and related structures) is moved to the right while the walking apparatuses 215 are raised above the base surface 205. After the walking apparatuses 215 have been repositioned, they are operated to be lowered to the base surface 205 as shown in FIG. 2C. This completes a single walking cycle, and further walking cycles or steps can be performed by repeating the steps described above with respect to FIGS. 2B to 2F.

Figure 3A:
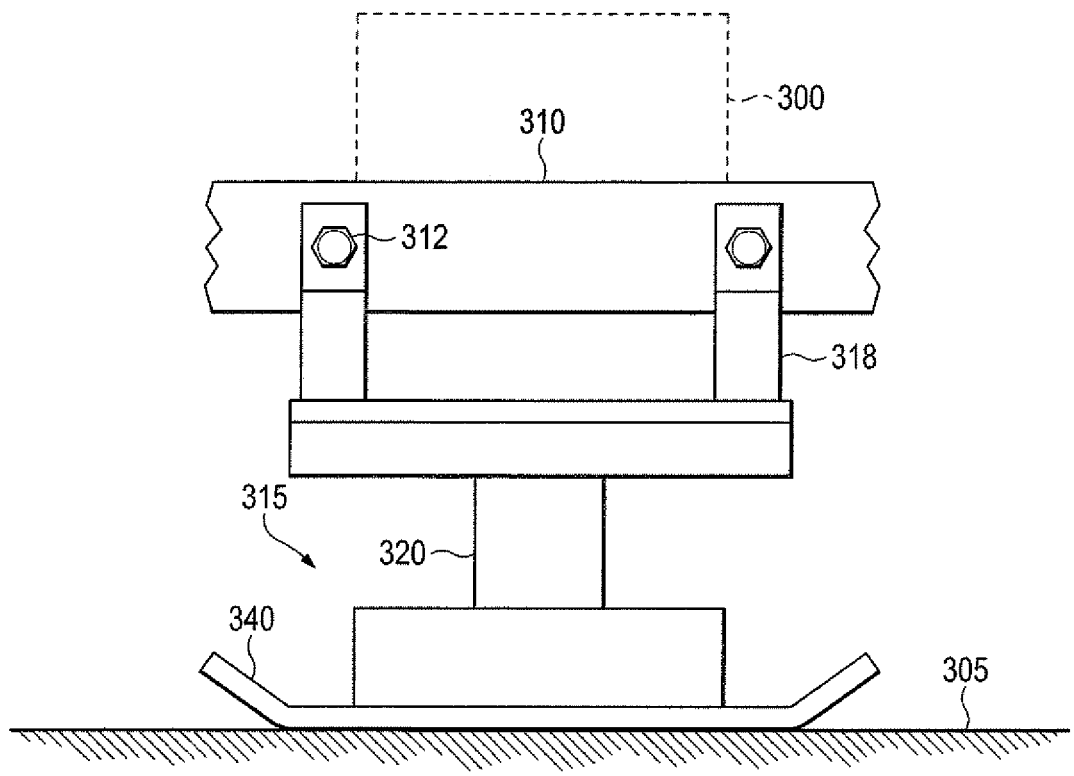
FIGS. 3A and 3B are diagrams illustrating example connection arrangements used to connect a walking apparatus to a load according to embodiments of the invention.
Figure 3B:
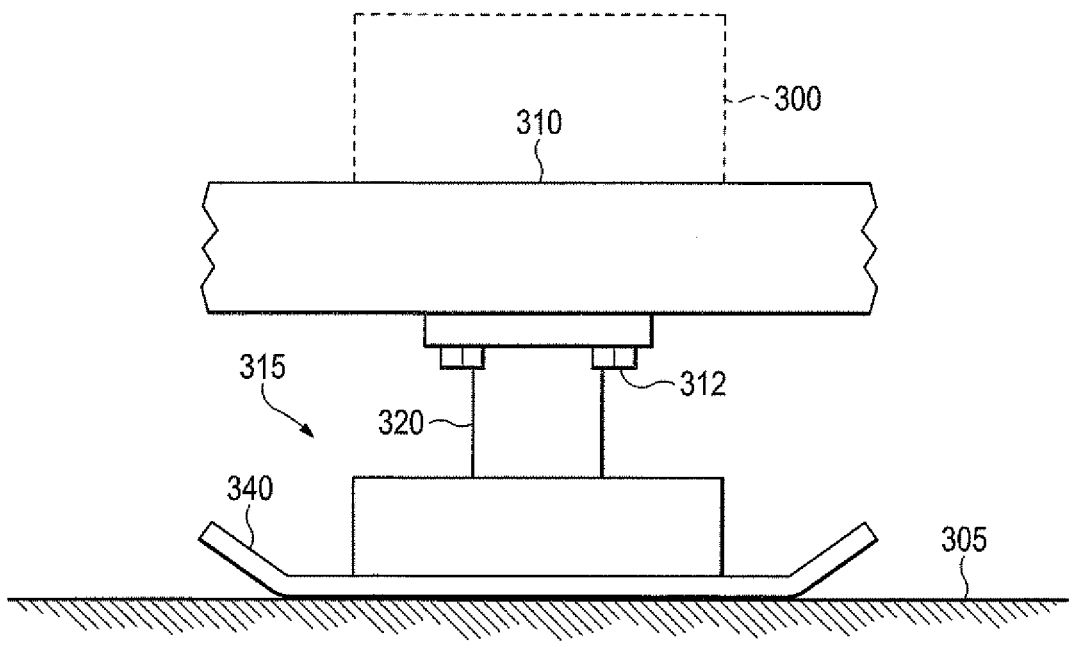

As mentioned above, walking apparatuses can be connected to loads in a variety of ways depending on the specific conditions surrounding the load. FIGS. 3A and 3B illustrate two such connection schemes. Although two connection schemes are illustrated in FIGS. 3A and 3B, embodiments of the invention are not limited to such connection schemes, as many different connection variations exist and are included in the scope of this concept.

Referring to FIG. 3A, a walking apparatus 315 includes a support foot 340 to interface with a base surface 305 and a lift mechanism 320 to raise and lower a load 300. In the embodiment shown in FIG. 3A, the lift mechanism 320 of the walking apparatus 315 is attached to a connection frame 318, which in turn is bolted to framework 310 supporting the load 300 with bolts 312 or other connection mechanisms. In some embodiments, the connection frame 318 may be part of the walking apparatus 315 and in some instances, may be permanently welded, bolted, or otherwise connected to the lift mechanism 320 of the walking apparatus. In other embodiments, the connection frame 318 may be separate from the walking apparatus 315, and may only be temporarily used with the walking apparatus in certain situations. In these embodiments, for example, multiple different connection frames 318 may be built or used with specific load conditions or specifications.

FIG. 3B shows different embodiments where the portions of a lift mechanism 320 of a walking apparatus 315 are directly connected to a support frame 310 structured to support a load 300 with bolts 312 or other connection mechanisms. The support frame 310 may be considered part of the load 300 in some instances where it is a permanent part of the load structure. For example, in instances where the load is a silo, such as shown in FIG. 1B, the metal frame of the silo may be considered the support frame 310 of the load 300, while also being part of the silo, and hence part of the load. In other cases, the support framework 310 may be an ancillary structure that is only used to stabilize and support the load 300 during movement of the load.

Figure 4:
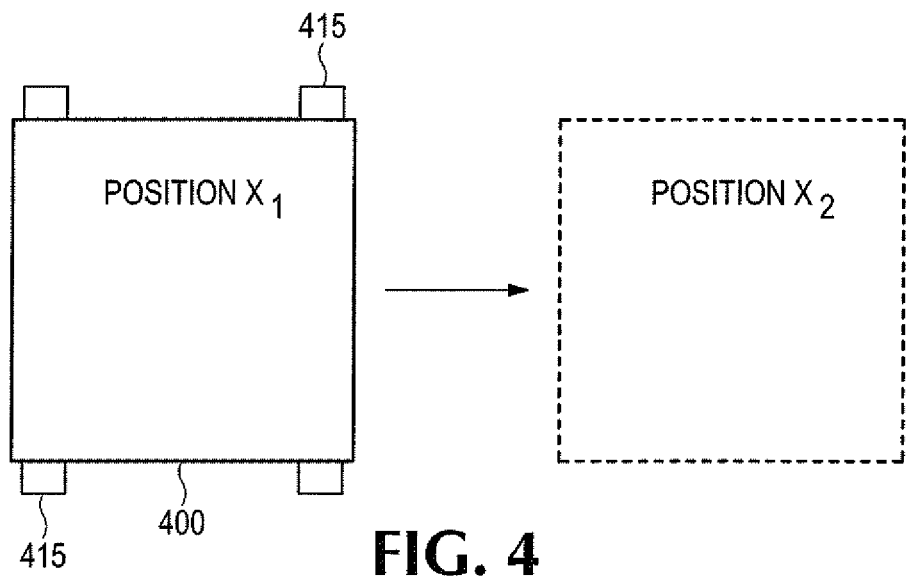
FIG. 4 is a schematic diagram illustrating movement of a load along a substantially linear path according to embodiments of the invention.

FIG. 4 is a schematic diagram illustrating movement of a load along a substantially linear path according to embodiments of the invention. Referring to FIG. 4, a load 400 is connected to multiple walking apparatuses 415, which are used to move the load from an initial position $X_1$ to a final position $X_2$ along a substantially linear path. Here, that path is a horizontal path moving from left to right. This type of basis linear movement can be accomplished by a variety of walking systems.

Figure 5:
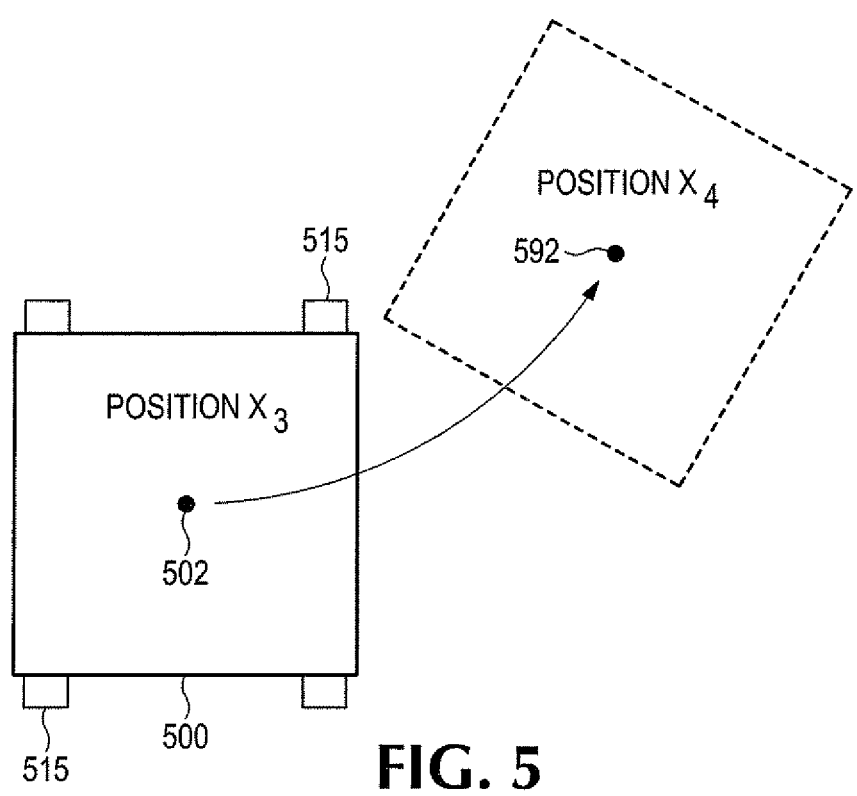
FIG. 5 is a schematic diagram illustrating movement of a load along a curved path according to embodiments of the invention.

FIG. 5 is a schematic diagram illustrating movement of a load along a curved path according to embodiments of the invention. Referring to FIG. 5, a load 500 is connected to multiple walking apparatuses 515, which are used to move the load from an initial position $X_3$ to a final position $X_4$ along a non-linear path. Here, a reference center-point 502 of the load 500 at the initial position $X_3$ is moved to a reference center-point 592 of the load 500 at the final position $X_4$. Unlike the linear movement shown in FIG. 4, this curved path of travel shown in FIG. 5 requires that the walking apparatuses be steered, which can be accomplished using embodiments of the inventive walking apparatuses described below.

Figure 6A:
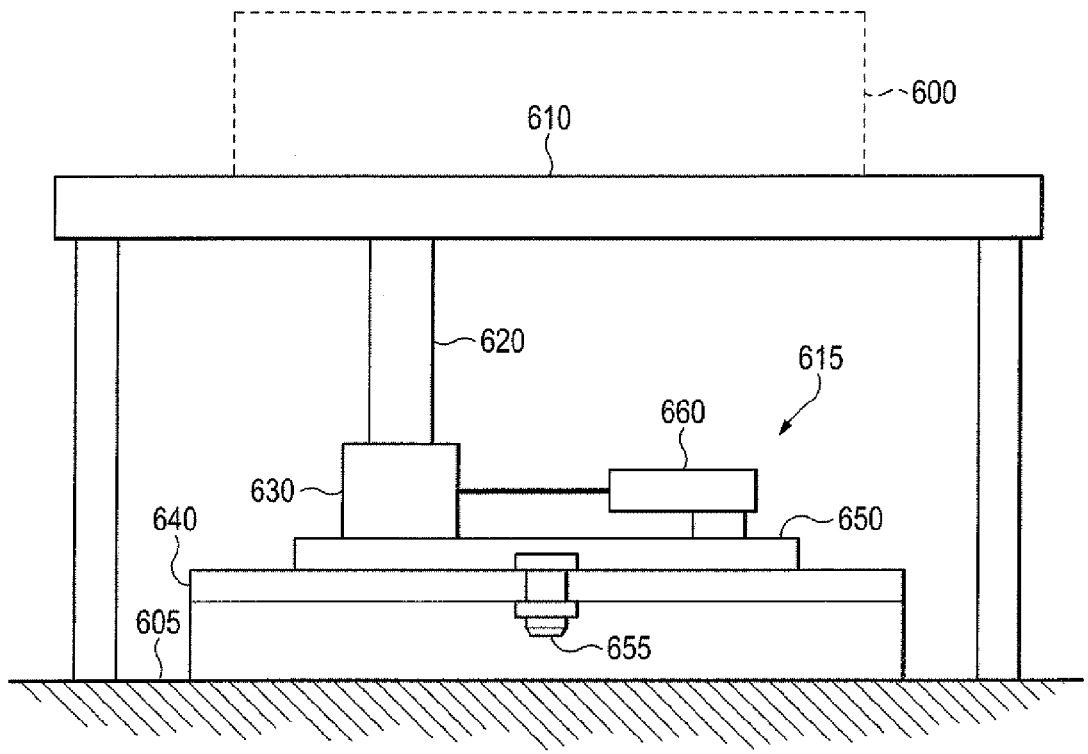
FIG. 6A is a schematic diagram of a side view of a walking apparatus according to embodiments of the invention.
Figure 6B:
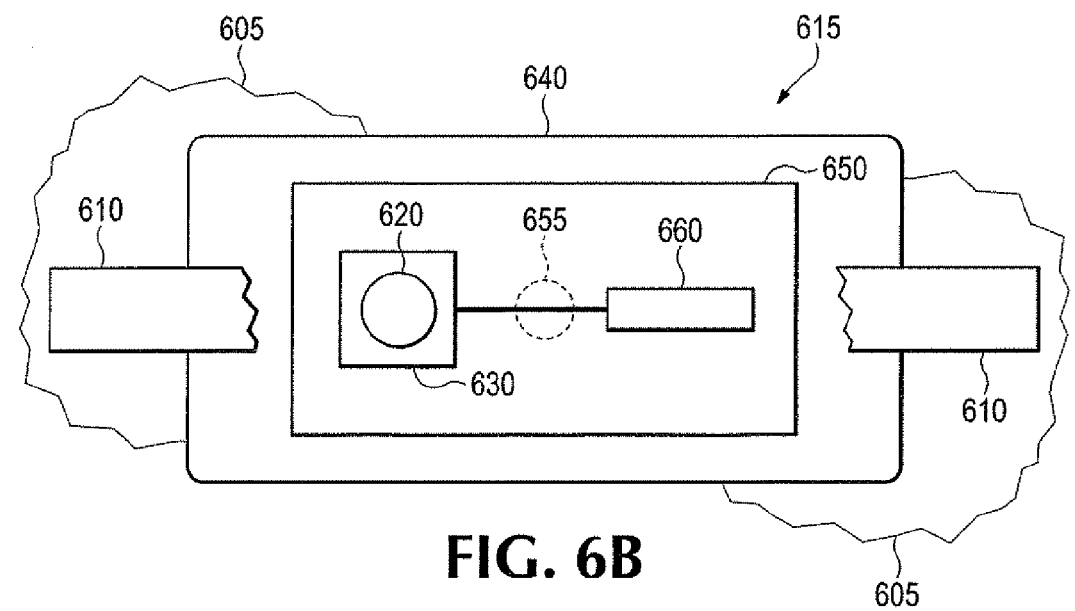
FIG. 6B is a schematic diagram of a top view of a walking apparatus according to embodiments of the invention.

FIGS. 6A and 6B are schematic side and top views of a walking apparatus according to embodiments of the invention. Referring to FIGS. 6A and 6B, a load transporting apparatus 615 is shown that is configured to move a load 600 over a base surface 605 in one or more incremental steps, each including a load-movement phase and a recovery phase. The load transporting apparatus 615 includes a lift mechanism 620 structured to lift a load-bearing frame 610 supporting the load 600, and a roller assembly 630 coupled to the lift mechanism. A roller track 650 is connected to the roller assembly 630 and configured to allow the roller assembly to move over the roller track in a first direction. The load transporting apparatus 615 also includes a travel mechanism 660 coupled to the roller track 650 and connected to the roller assembly 630, the travel mechanism structured to displace the roller assembly relative to the roller track along the first direction. A support foot 640 is also included in the load transporting apparatus 615. The support foot 640 is positioned below the roller track 650, and is structured to interface with the base surface 605. A pin connector 655 is used to connect the support foot 640 with the roller track 650, and is structured to allow the roller track to rotate relative to the support foot.

In these embodiments, the roller track 650 is separate from, but connected to the support foot 640 that contacts the base surface 605. As discussed above, the support foot 640 is connected to the roller track 650 with a pin connector 655, which allows the roller track to rotate relative to the support foot. This means that the support foot 640 can be oriented in a first direction while the roller track 650 is oriented in a second direction. As discussed in more detail below, this ability to vary the orientations of the roller track 650 and support foot 640 allows the load supporting apparatus 615 to be precisely steered, which in turns allows a load 600 to be moved more efficiently between locations.

In some embodiments, the pin connector 655 is a king pin connector that allows rotation about an axis in one degree of freedom, while limiting movement in other planes of travel. In some embodiments, the pin connector may further include a bearing (not shown) to facilitate smooth rotational movements. However, because of the heavy weight associated with the loads 600 being moved by the walking apparatus 615, other embodiments do not have a bearing to prevent damage to the internal structure of a bearing.

Figure 7A:
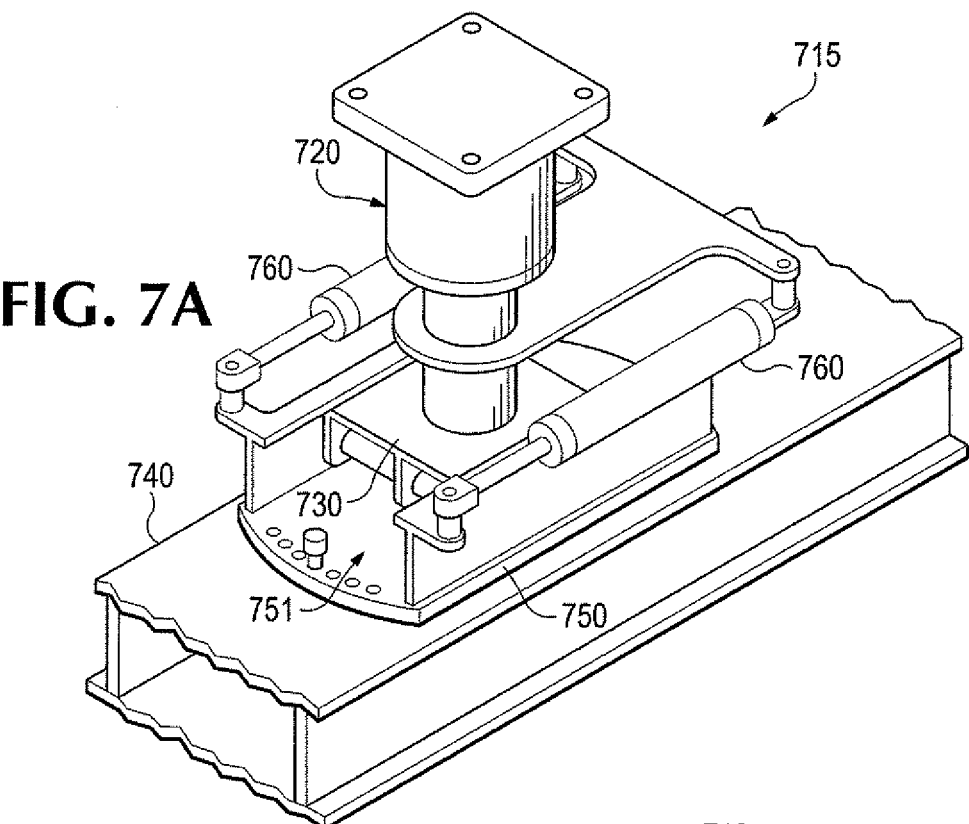
FIG. 7A is a perspective view of a walking apparatus according to embodiments of the invention.
Figure 7B:
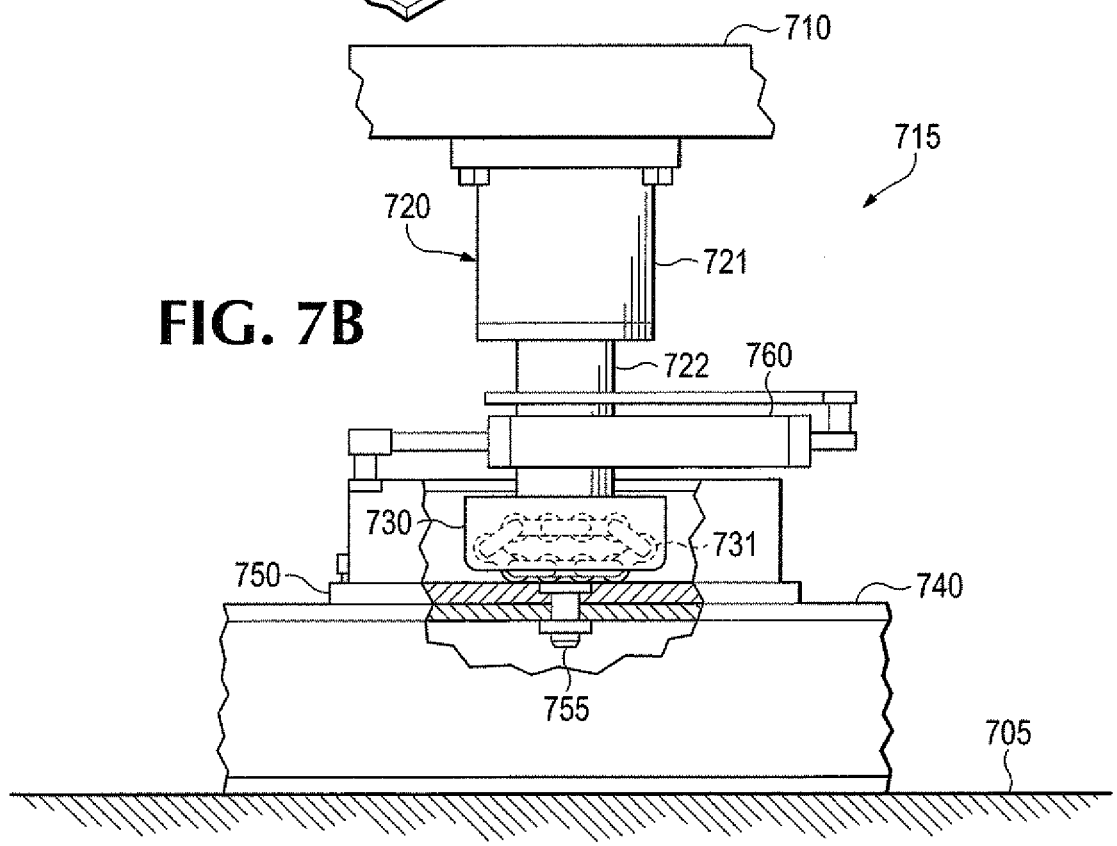
FIG. 7B is a side view of the walking apparatus shown in FIG. 7A.

FIGS. 6A and 6B are presented in a schematic style view as many possible variations in the appearance and mechanical structure of the load transporting apparatus 615 exist. FIGS. 7A and 7B provide a more detailed view of one embodiment of a load transporting apparatus. FIG. 7A is a perspective view of a walking apparatus according to embodiments of the invention. FIG. 7B is a side view of the walking apparatus shown in FIG. 7A. Referring to FIGS. 7A and 7B, a load transporting or walking apparatus 715 includes a lift mechanism 720, a roller assembly 730, a roller track 750, and a support foot 740. The lift mechanism 720 may include a hydraulic jack suspended from a horizontal beam of the load-bearing frame 710.

The lift mechanism 720 may include a lift cylinder 720 that is connected to a load-bearing frame 710, and a cylinder rod 722 coupled to the roller assembly 730. Here, the cylinder rod 722 may be structured to allow the roller assembly 730 to rotate about a substantially vertical axis in the center of the cylinder rod. That is, the roller assembly 730 may be free to rotate around the cylinder rod 722. The connection between the roller assembly 730 and the cylinder rod may be a bearing or one of a number of different connection variations. In one embodiment, the cylinder rod 722 may include a groove (not shown) around side edges of a lower portion of the cylinder rod, where the groove corresponds to a retainer cuff (not shown) of the roller assembly 730. In this example the retainer cuff is rotatable around the groove, but may easily be assembled or disassembled during installation, break-down, or transportation of the walking apparatus 715.

Although the embodiment shown in FIGS. 7A and 7B show the lift cylinder 721 connected to the load bearding frame 710 and the cylinder rod 722 connected to the roller apparatus 730, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 715 may also include a travel mechanism 760 that is connected to the roller track 750 and coupled to the roller assembly 730 such that when the travel mechanism is activated, the roller assembly moves relative to the roller track. In the embodiment shown in FIGS. 7A and 7B, the travel mechanism 760 includes two travel cylinders mounted on the roller track 750 on opposite sides of the roller track. Here, the travel cylinders of the travel mechanism 760 may balance the load being moved by the roller assembly 730 over the roller track 750. In other embodiments, one travel cylinder, or three or more travel cylinders may be used to move the roller assembly 730 relative to the roller track 750. In other embodiments, the travel mechanism 760 may include different movement structures, such as pulleys, levers, winches, tracks, etc.

In the embodiments shown in FIGS. 7A and 7B, the roller assembly 730 may include a plurality of rollers or roller chain 731 that rotate as well as roll on the roller track 750. That is, in some embodiments, the roller assembly 730 may include a WBOT series roller assembly from Hillman Rollers, such as shown in FIG. 7B. Due to the configuration of the roller chain 731 of the roller assembly 730 and the tolerance between the roller assembly and the roller track 750 of the walking machine 715, the rollers of the roller chain will typically be engaged with the roller track during operation and use of the walking machine.

As discussed above, the roller assembly 730 may be secured to the lower end of the cylinder rod 722, with the roller assembly being captured within a U-shaped roller track 750 as shown in FIG. 7A. The roller assembly 730 may be configured to roll along the bottom inside surface of the roller track 750 as well as along the underside of the two upper flanges of the roller track. The one or more travel cylinders 760 may be coupled between the cylinder rod 722 and the roller track 750. Accordingly, as will be understood from the more detailed discussion below, these travel cylinders 760 permit for the translation of the roller track 750 relative to the lift mechanism 720 and vice versa. The roller track 750 may be secured to an elongate ground-engaging foot 740 (support foot) via a rotational pin 755, which enables the roller track to be rotationally positioned relative to the foot for steering of the walking machine 715.

In some embodiments, the roller track 750 may include travel slots 751 structured to connect the roller assembly 730 to the roller track 750. Here, the travel slots 751 may be configured to allow substantially linear movement of the roller assembly 730 across the roller track 750.

As shown in co-pending application Ser. No. 13/711,269, entitled ALIGNMENT RESTORATION DEVICE FOR LOAD TRANSPORTING APPARATUS, the contents of which are herein incorporated by reference in their entirety, a walking apparatus 715 may also include one or more linking devices coupled to the support foot 740. One or more biasing devices may be coupled to the linking devices, where the biasing devices are structured to become activated during a load-movement phase when the roller assembly 730 travels in a direction that is not parallel or perpendicular to a lengthwise direction that the support foot 740 is oriented, and structured to return the support foot to an aligned position relative to the load-bearing frame 710 during a recovery phase.

In some embodiments, the one or more biasing devices may become activated when an angular displacement occurs between the support foot 740 and the load-bearing frame 710, where the activation of the one or more biasing devices includes a torquing force being applied to the one or more biasing devices. In other embodiments, the linking devices may be structured to be connected to at least one other load transporting apparatus.

As shown in co-pending application Ser. No. 13/711,315, entitled CENTERING DEVICE FOR LOAD TRANSPORTING APPARATUS, the contents of which is herein incorporated by reference in its entirety, a walking apparatus 715 may also include one or more guide devices positioned adjacent to the roller assembly 730, and one or more biasing devices coupled to the guide devices. Here, the biasing devices may be structured to become deflected during a load-movement phase when the roller assembly 730 travels in a direction that is not parallel or perpendicular to a lengthwise direction that the support foot 740 is oriented, and structured to return the support foot to a centered position relative to the support foot 740 during a recovery phase.

Figure 8A:
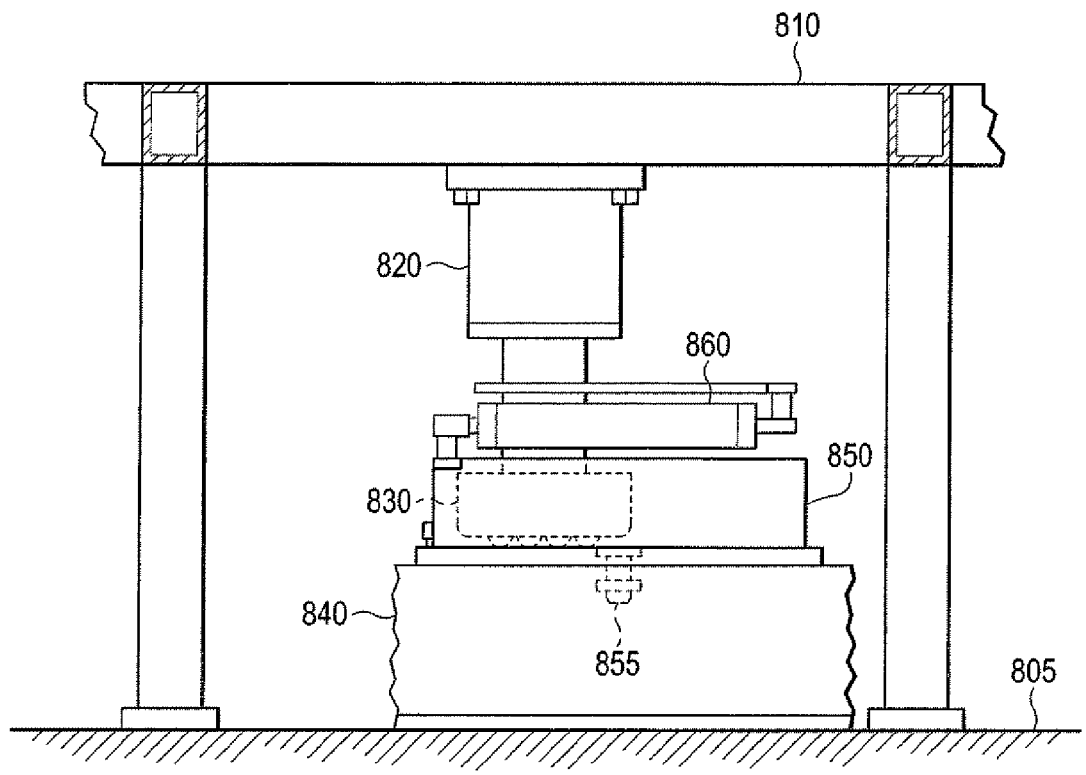
FIGS. 8A, 8B, 8C, 8D, 8E, and 8F are diagrams illustrating an example operation progression of a walking apparatus according to embodiments of the invention.

FIGS. 8A, 8B, 8C, 8D, 8E, and 8F are diagrams illustrating an example operation progression of a walking apparatus according to embodiments of the invention. Here, FIGS. 8D-8E may show a load-movement phase of a walking cycle, while FIG. 8F may show a recovery phase of a walking cycle. Referring to FIG. 8A, a walking apparatus includes a support foot 840 positioned on a base surface 805 and connected to roller track 850 via a rotation pin 855. The roller track 850 is structured to allow a roller assembly 830 to move relative to the roller track when activated by a travel mechanism 860. A lift mechanism 820, such as hydraulic jack, is connected between the roller assembly 830 and load-bearing frame 810. As shown in FIG. 8A, the walking apparatus is in an operational position where it is both connected to the load-bearing frame 810 and positioned on the base surface 805.

Figure 8B:
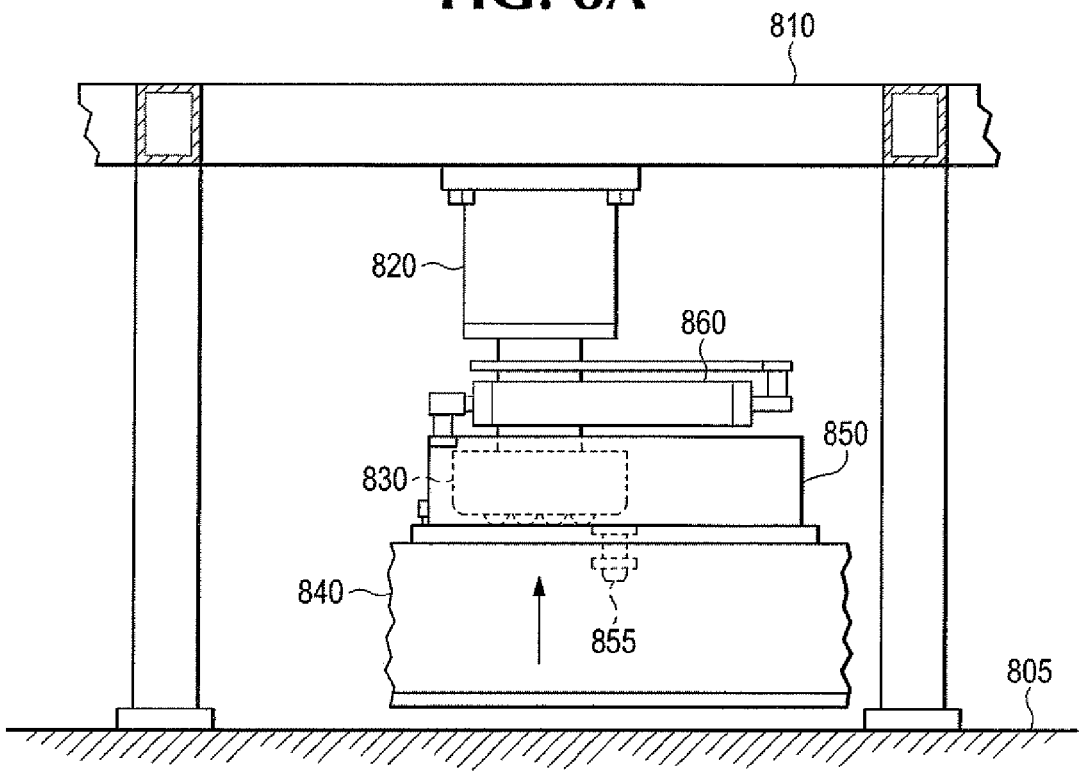

Referring to FIG. 8B, a step in a walking motion of the walking machine is illustrated. Specifically, as indicated by the vertical arrows pointing up, when the lift mechanism 820 is activated, the roller assembly 830, the roller track 850, and the foot 840 are lifted above the base surface or ground 805 as a single unit. This is due in part because the roller assembly 830, which is secured to the lower end of the travel mechanism 820, is captured by the roller track, as discussed above.

Figure 8C:
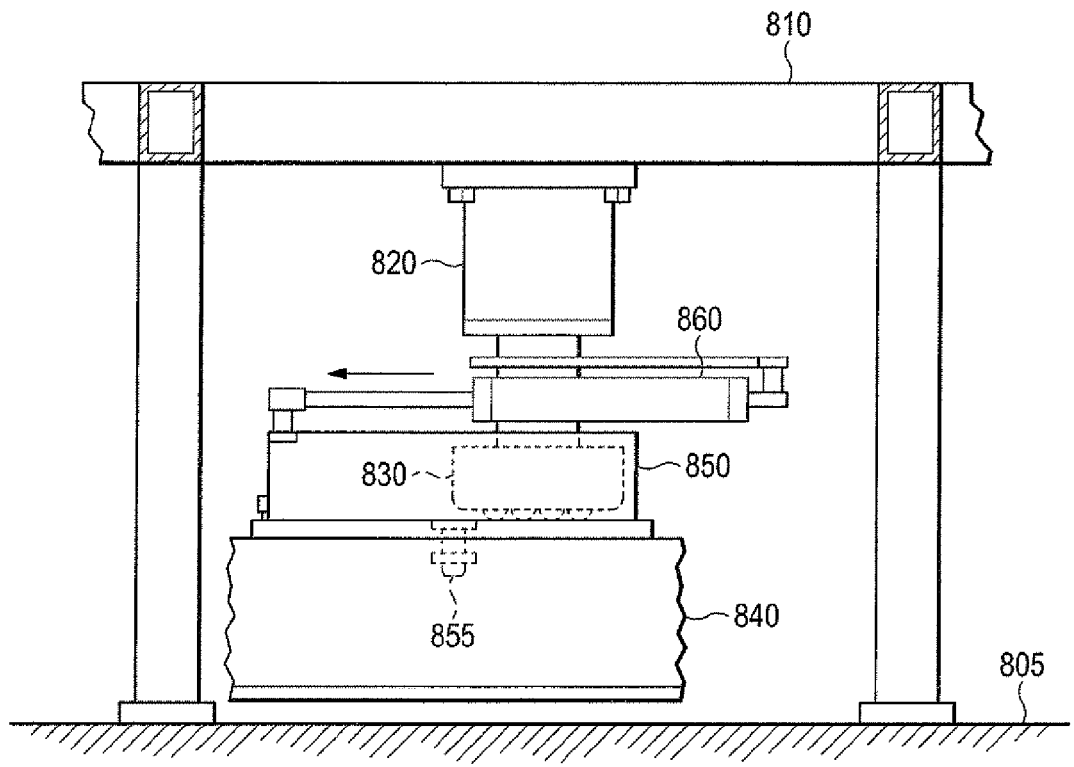

Referring to FIG. 8C, a next step in a walking motion of the walking machine is illustrated. Here, as indicated by the horizontal arrow pointing to the left, the travel cylinders 860 are extended to shift the roller track 850 to the left along the roller assembly 830. Because the roller track 850 is secured to the foot 840 via the rotation pin 855, the foot also is shifted to the left. The distance of travel of the foot 840 may be limited by the operable travel, or throw, of the travel cylinders 860. Because the lateral travel is limited, the roller tracks 850 only need to be long enough to accommodate the corresponding distance traveled by the roller assembly 830. As illustrated in FIG. 8C, this step occurs while the foot is lifted completely off of the base or ground surface 805, and with the full weight of the load being supported by the load-bearing or main frame 810 and its ground-engaging portions.

Figure 8D:
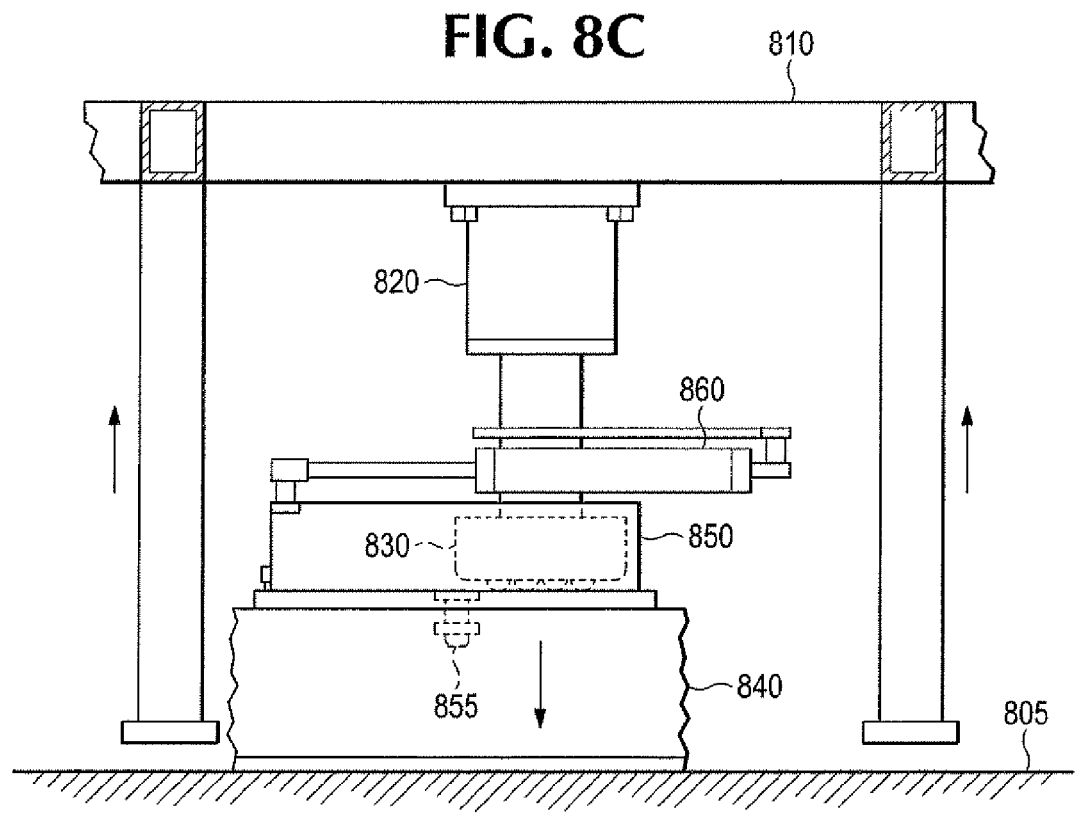

Referring to FIG. 8D, the next step of the walking process is shown. Here, the lift mechanism 820 is activated (i.e., the cylinder rod of the hydraulic jack is forced out of the lift cylinder) causing the foot 840 to engage the base surface 805. As the lift mechanism 820 continues to operate, the ground-engaging portions of the load-bearing frame 810 are lifted off of the base surface 805, so that the entire weight of the load is then supported by the support foot 840.

Figure 8E:
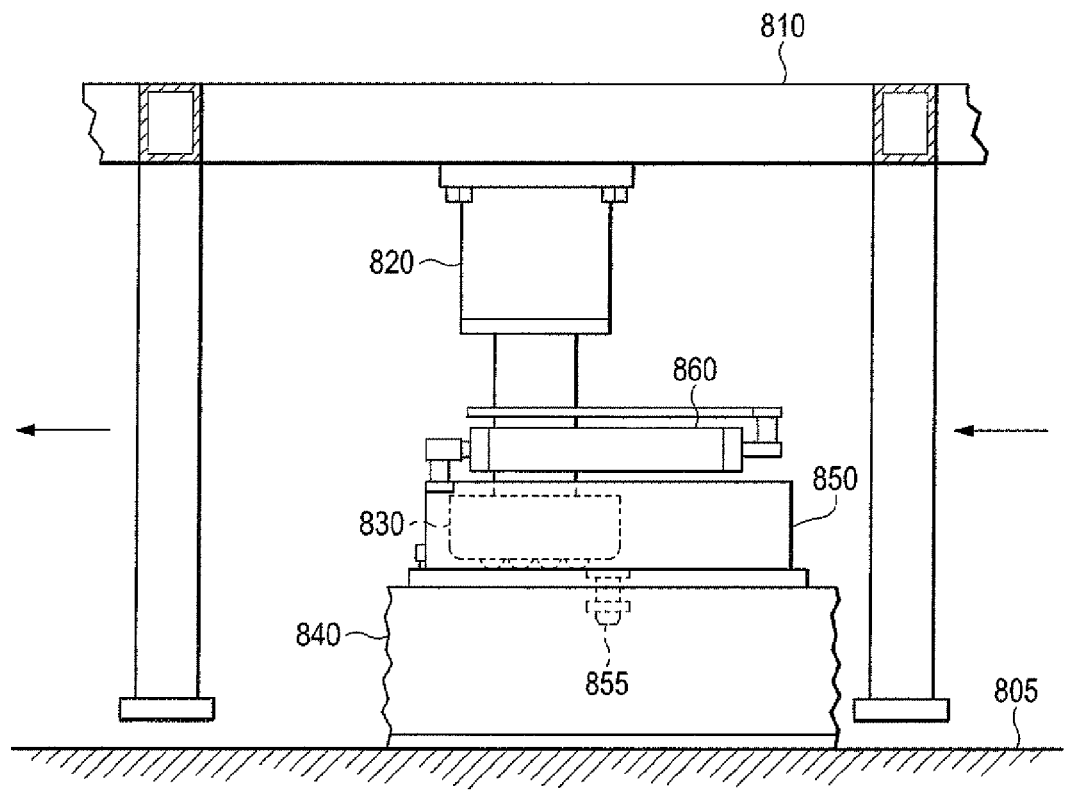

Referring to FIG. 8E, while the load-bearing frame 810 is lifted off of the base surface 805, and the foot 840 is supporting the load, the travel cylinders 860 are retracted, causing the entire load-bearing frame 810, including the supported load, to translate to the left, as indicated by the horizontal arrows pointing to the left in the view shown in FIG. 8E. As shown in this figure, the load-bearing frame 810 has shifted to the left away from its starting position, a distance corresponding to the operable throw of the travel cylinders 860. During this translation to the left, the roller assembly 830 rolls along the bottom inside surface of the roller track 850.

Figure 8F:
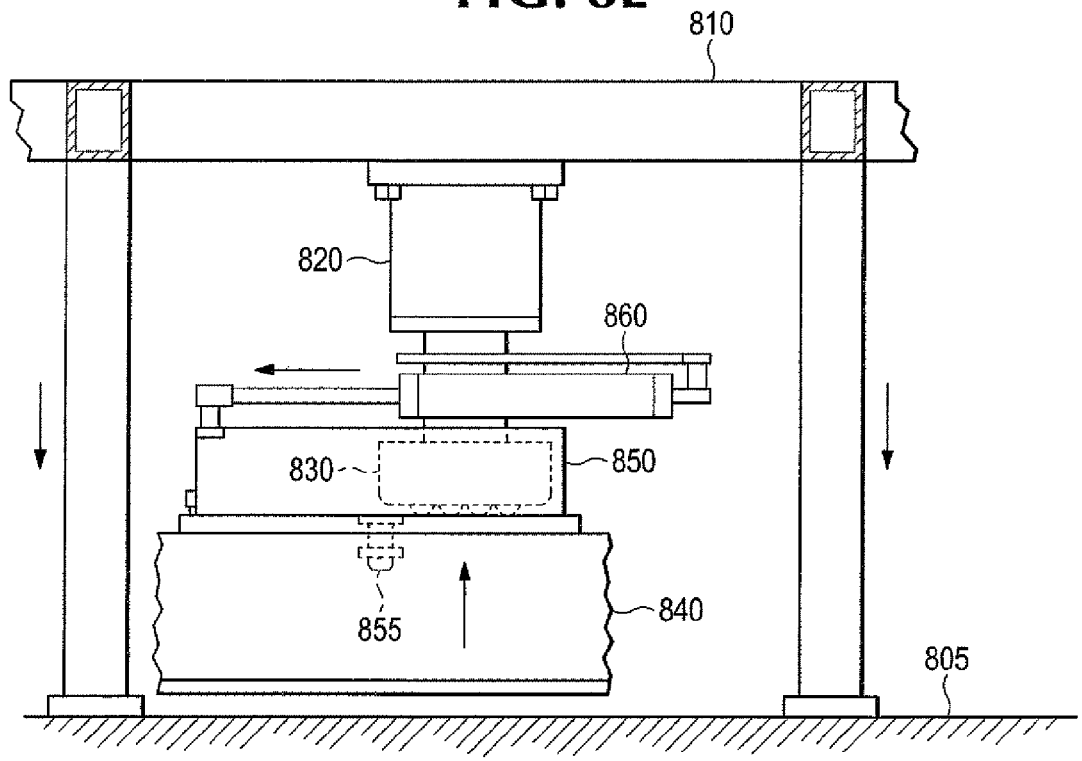

Referring to FIG. 8F, the rod of the lift mechanism 820 is retracted, which causes the load-bearing frame 810 to be lowered and to engage the base surface 805 and support the load. As the lift mechanism 820 continues to be activated, the foot 840 is lifted off of the base surface 805. Thus, the walking machine returns to a similar orientation as shown in FIG. 8B and FIG. 8C. To continue moving, the steps shown in FIGS. 8C-8F may be repeated. Accordingly, cycling through the above illustrated sequential steps will cause the walking apparatus to walk across the base surface 805.

Figure 9A:
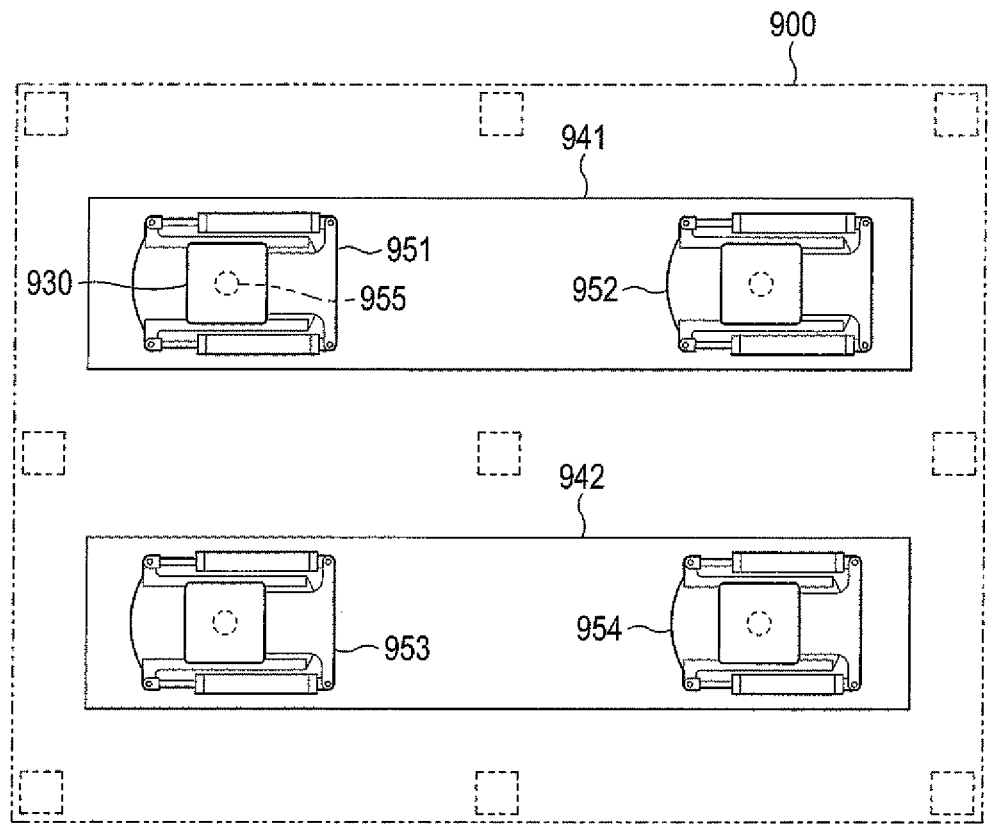
FIG. 9A is a plan view of walking apparatuses positioned below a load according to embodiments of the invention.
Figure 9B:
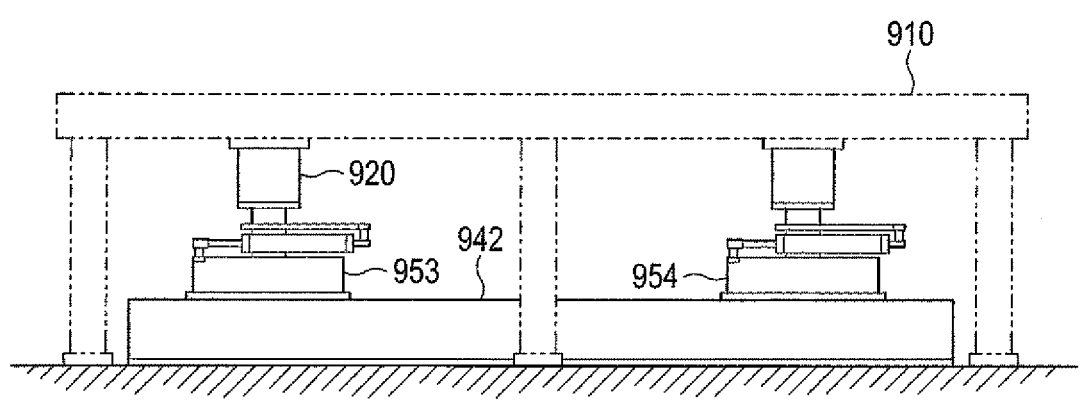
FIG. 9B is a side view of the walking apparatuses shown in FIG. 9A.

FIG. 9A is a plan view of walking apparatuses positioned below a load according to embodiments of the invention. FIG. 9B is a side view of the walking apparatuses shown in FIG. 9A. Referring to FIGS. 9A and 9B, a load 900 is supported by four walking apparatuses 951, 952, 953, 954. Here, a first walking apparatus 951 and third walking apparatus 952 are connected to a first support foot 941 and a second walking apparatus 953 and fourth walking apparatus 954 are connected to a second support foot 942. Each of the walking apparatuses 951, 952, 953, 954 include a roller assembly 930 and a rotation pin 955.

That is, a load transporting system that is configured to move a load 900 over a base surface in one or more incremental steps each including a load-movement phase and a recovery phase includes a load-bearing frame 910 structured to support the load 900 on the base surface. The load transporting system includes a first load transporting apparatus 951 including a first lift mechanism 920 coupled to the load-bearing frame 910 and structured to lift the load-bearing frame supporting the load 900. The first load transporting apparatus 951 also includes a first roller assembly 930 coupled to the first lift mechanism 920, a first roller track connected to the first roller assembly and configured to allow the first roller assembly to move over the first roller track in a first direction, and a first travel mechanism coupled to the first roller track and connected to the first roller assembly, the first travel mechanism structured to displace the first roller assembly relative to the first roller track along the first direction. The first load transporting apparatus is connected to a first support foot 941 positioned below the first roller track, the first support foot structured to interface with the base surface. The first support foot 941 is connected to the first roller track with a first pin connector 955. The first pin connector 955 is structured to allow the first roller track 930 to rotate relative to the first support foot.

The load transporting system also includes a second load transporting apparatus 953 that includes a second lift mechanism 920 coupled to the load-bearing frame 910 and structured to lift the load-bearing frame supporting the load 900. The second load transporting apparatus 953 includes a second roller assembly 930 coupled to the second lift mechanism 920, a second roller track connected to the second roller assembly and configured to allow the second roller assembly to move over the second roller track in a second direction, and a second travel mechanism coupled to the second roller track and connected to the second roller assembly, the second travel mechanism structured to displace the second roller assembly relative to the second roller track along the second direction. The second load transporting apparatus is connected to a second support foot 942 positioned below the second roller track, the second support foot structured to interface with the base surface. The second support foot 942 is connected to the second roller track with a second pin connector 955. The second pin connector 955 is structured to allow the second roller track 930 to rotate relative to the second support foot.

As shown in FIGS. 9A and 9B, however, additional walking apparatuses are connected to each of support foot. In other embodiments, more than two walking apparatuses may be coupled to the same support foot. In other embodiments, more than two support feet with multiple walking machines are needed to safely and/or efficiently lift and transport a load. For example, a third load transporting apparatus 952 may be connected to the same first support foot 941 as the first load transporting apparatus 951, and a fourth load transporting apparatus 954 may be connected to the same second support foot 942 as the second load transporting apparatus 953.

Here, the third load transporting apparatus 952 may include a third lift mechanism 920 coupled to the load-bearing frame 910 and structured to lift the load-bearing frame supporting the load 900. The third load transporting apparatus 952 may also include a third roller assembly 930 coupled to the third lift mechanism 920, a third roller track connected to the third roller assembly and configured to allow the third roller assembly to move over the third roller track in a first direction, and a third travel mechanism coupled to the third roller track and connected to the third roller assembly, the third travel mechanism structured to displace the third roller assembly relative to the third roller track along the first direction. A third pin connector 955 may connect the first support foot 941 with the third roller track, the third pin connector structured to allow the third roller track to rotate relative to the first support foot.

Additionally, the fourth load transporting apparatus 954 may include a fourth lift mechanism 920 coupled to the load-bearing frame 910 and structured to lift the load-bearing frame supporting the load 900. The fourth load transporting apparatus 954 may include a fourth roller assembly 930 coupled to the fourth lift mechanism 920, a fourth roller track connected to the fourth roller assembly and configured to allow the fourth roller assembly to move over the fourth roller track in a second direction, and a fourth travel mechanism coupled to the fourth roller track and connected to the fourth roller assembly, the fourth travel mechanism structured to displace the fourth roller assembly relative to the fourth roller track along the second direction. A fourth pin connector 955 may connect the second support foot 942 with the fourth roller track, the fourth pin connector structured to allow the fourth roller track to rotate relative to the second support foot.

As described above, embodiments of the disclosed walking machine are capable of being steered while transporting a load across a base or ground surface. Since each roller track is rotationally secured to a foot with a rotation or king pin, the roller track is able to be selectively rotated relative to the foot. FIGS. 10A-10E illustrated exemplary steering modes that that made possible by utilizing a rotational pin to connect the support foot to the roller track.

Figure 10A:
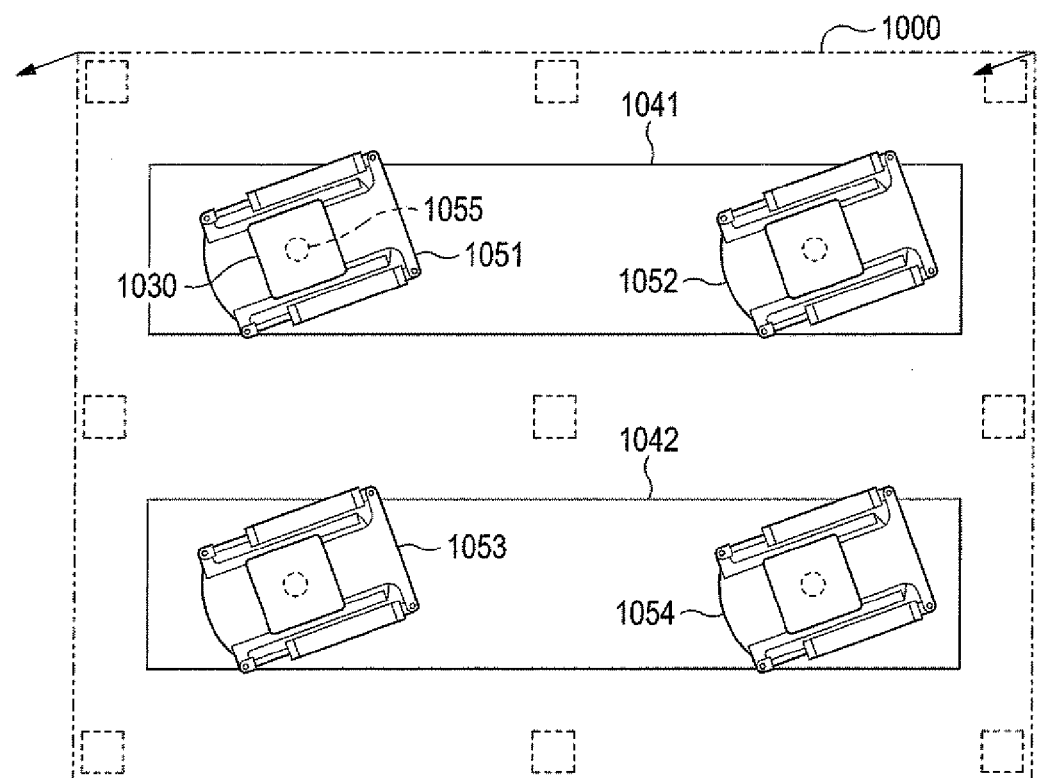
FIG. 10A is a plan view of the walking apparatuses shown in FIG. 9A in a crab-steering orientation according to embodiments of the invention.
Figure 10B:
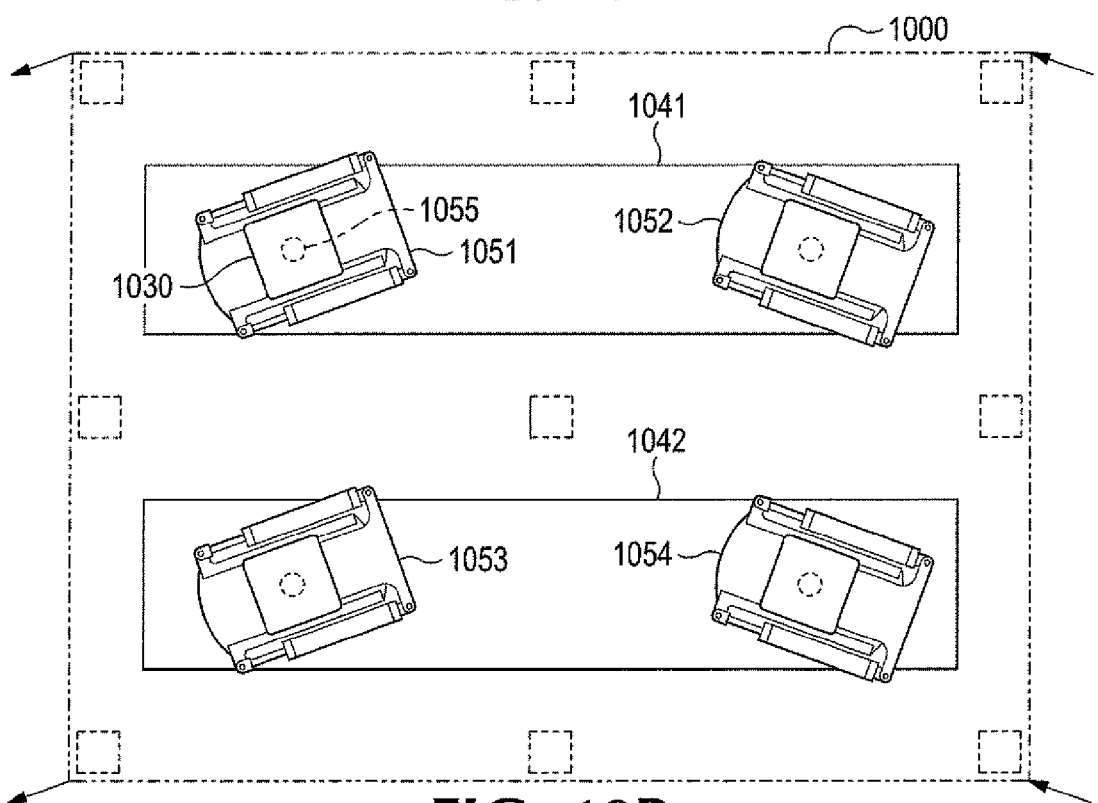
FIG. 10B is a plan view of the walking apparatuses shown in FIG. 9A in a complimentary-steering orientation according to embodiments of the invention.
Figure 10C:
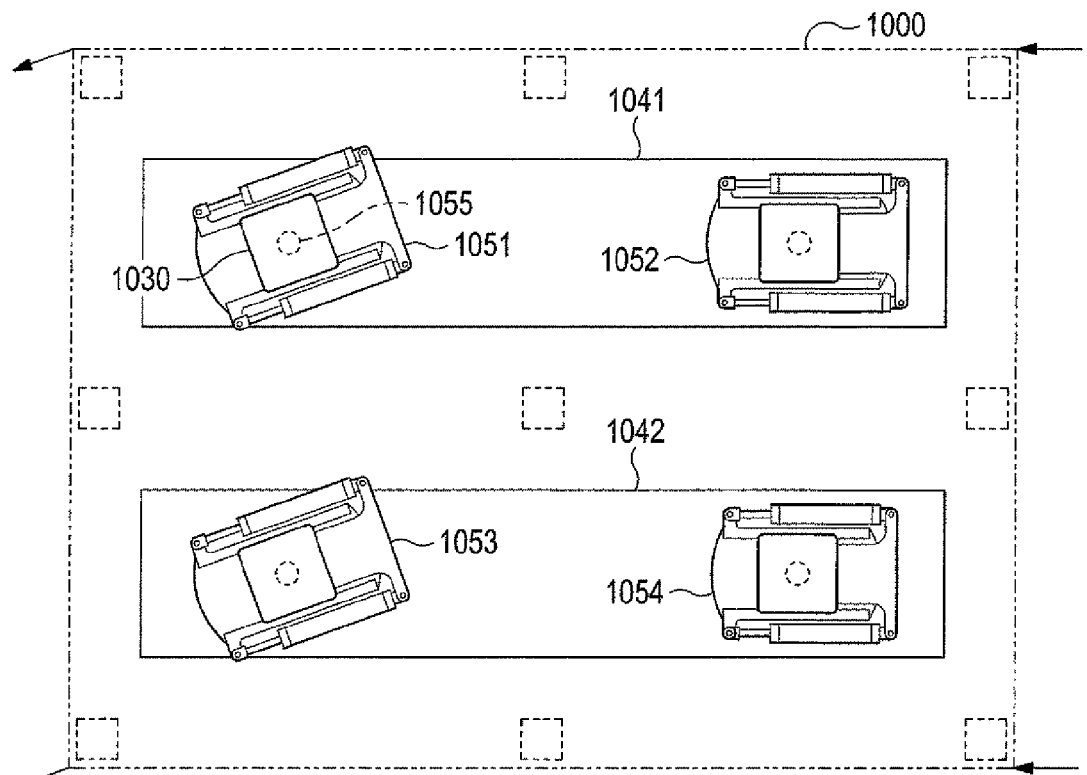
FIG. 10C is a plan view of the walking apparatuses shown in FIG. 9A in a simple-steering orientation according to embodiments of the invention.
Figure 10D:
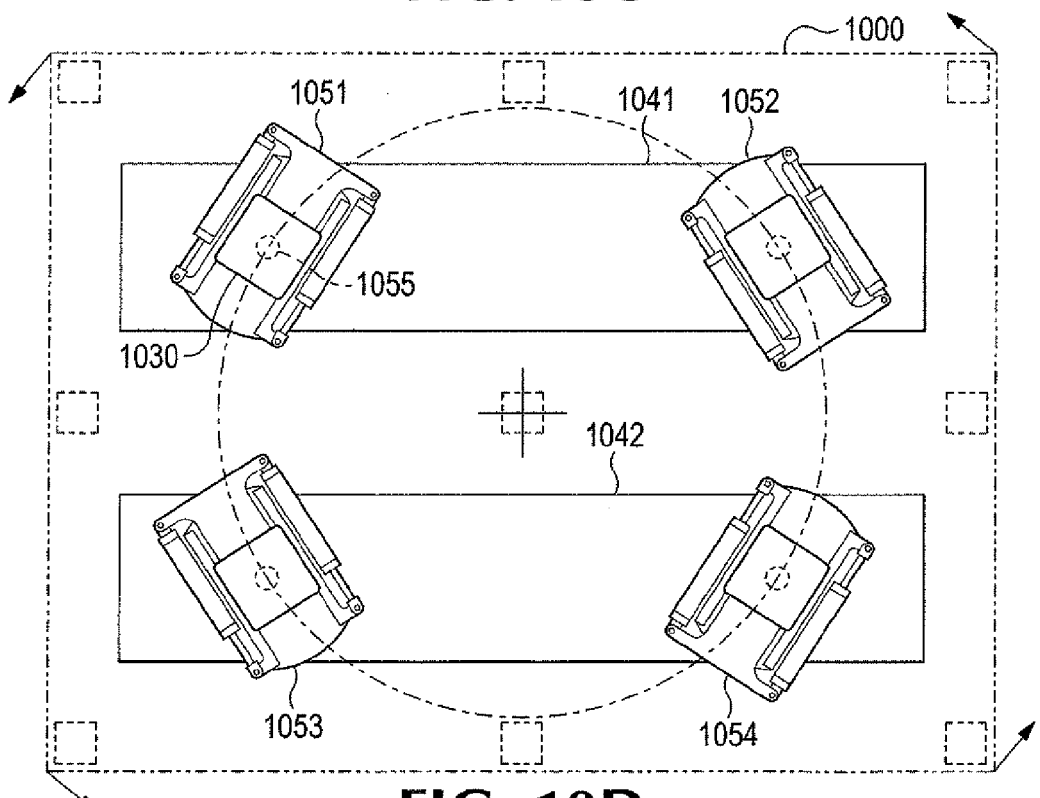
FIG. 10D is a plan view of the walking apparatuses shown in FIG. 9A in a spin-steering orientation according to embodiments of the invention.
Figure 10E:
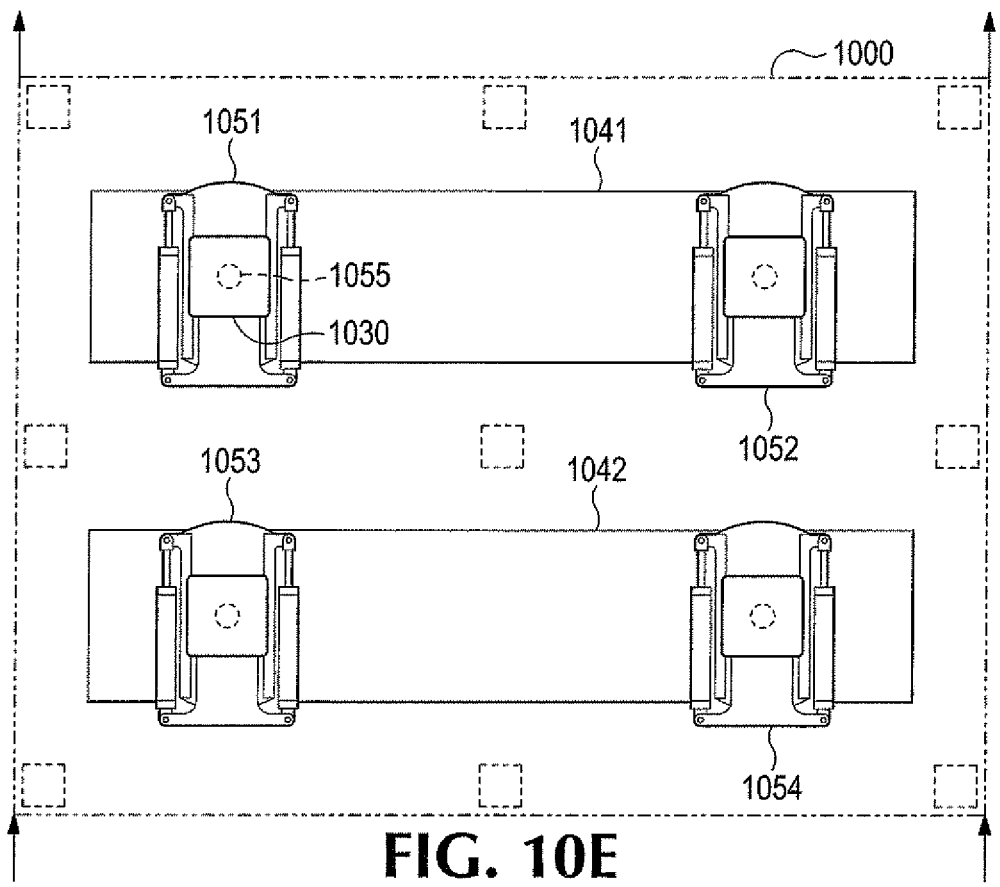
FIG. 10E is a plan view of the walking apparatuses shown in FIG. 9A in a perpendicular-steering orientation according to embodiments of the invention.

FIG. 10A is a plan view of the walking apparatuses shown in FIG. 9A in a crab-steering orientation according to embodiments of the invention. FIG. 10B is a plan view of the walking apparatuses shown in FIG. 9A in a complimentary-steering orientation according to embodiments of the invention. FIG. 10C is a plan view of the walking apparatuses shown in FIG. 9A in a simple-steering orientation according to embodiments of the invention. FIG. 10D is a plan view of the walking apparatuses shown in FIG. 9A in a spin-steering orientation according to embodiments of the invention. FIG. 10E is a plan view of the walking apparatuses shown in FIG.

9A in a perpendicular-steering orientation according to embodiments of the invention.

Referring to FIG. 10A, a load 1000 connected to lift mechanisms 920 (FIG. 9B) of multiple load transporting apparatuses 1051, 1052, 1053, 1054 can be steered by rotating roller tracks and roller assemblies 1030 to a direction of travel even though support feet 1041, 1042 are not moved so as to be oriented in the same direction of travel. As shown in FIG. 10A, orienting the walking machines 1051, 1052, 1053, 1054 in diagonal directions relative to the orientation of the support feet 1041, 1042 allows for the load 1000 to be moved at a diagonal.

Referring to FIG. 10B, orienting the left two (or more) walking machines 1051, 1053 in a first direction and orienting the right two (or more) walking machines 1052, 1054 in a second complementary direction, allows the load 1000 to be moved and steered in a complimentary-steering mode.

Referring to FIG. 10C, orienting the left two (or more) walking machines 1051, 1053 in a first direction and orienting the right two (or more) walking machines 1052, 1054 in a second orthogonal direction, allows the load 1000 to be moved and steered in a simple-steering mode.

Referring to FIG. 10D, orienting first diagonally opposite walking machines 1051, 1054 in a first direction and orienting second diagonally opposite walking machines 1052, 1053 in a second direction, allows the load 1000 to be moved and steered in a spin-steering mode.

Referring to FIG. 10E, orienting the walking machines 1051, 1052, 1053, and 1054 in a direction perpendicular to the orientation of the support feet 1041, 1042 allows the load 1000 to be moved in a vertical or perpendicular direction relative to the orientation of the support feet.

These and other steering modes may be possible in part because each of the walking machines 1051, 1052, 1053, 1054 include rotation pins 1055 that allows them to be oriented in different directions from the orientation of the support feet 1041, 1042. This can be useful, for example where the support feet 1041, 1042 have a length dimension greater than the distance between support beam elements of the load-bearing frame. That is, the support feet themselves could not be rotated to a desired direction of travel because they would contact the support frame beams when trying to rotate them to a direction of travel.

Figure 11:
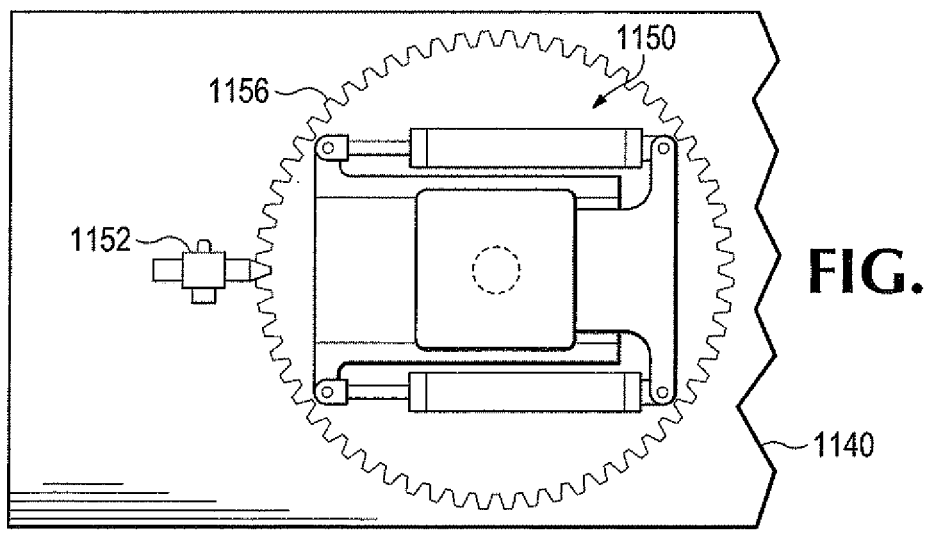
FIG. 11 is a detail diagram of a roller track configuration in a walking apparatus according to embodiments of the invention.

FIG. 11 is a detail diagram of a roller track configuration in a walking apparatus according to embodiments of the invention. Referring to FIG. 11, a roller track 1150 is positioned over a support foot 1140 and connected to the support foot with a rotation pin (655 FIG. 6). As shown in this embodiment, the roller track 1150 has a substantially circular footprint over the support foot 1140. This substantially circular footprint may allow uniform rotation of the roller track 1150 relative to the support foot 1140. Further, in some embodiments, the roller track 1150 may include a plurality of gear teeth 1156 along a bottom edge of the roller track. In these embodiments, the walking device may also include a locking device (or steering dog) 1152 that is structured to fix the position of the roller track 1150 relative to the support foot 1140. Fixing the position of the roller track 1150 relative to the support foot 1140 can be beneficial so that the alignment of the roller track relative to the support foot does not become skewed during multiple steps made by the walking device. Additionally, being able to fix the roller track 1150 relative to the support foot 1140 allows for precise directional-positioning of multiple walking devices to make more complicated steering movements.

Figure 12:
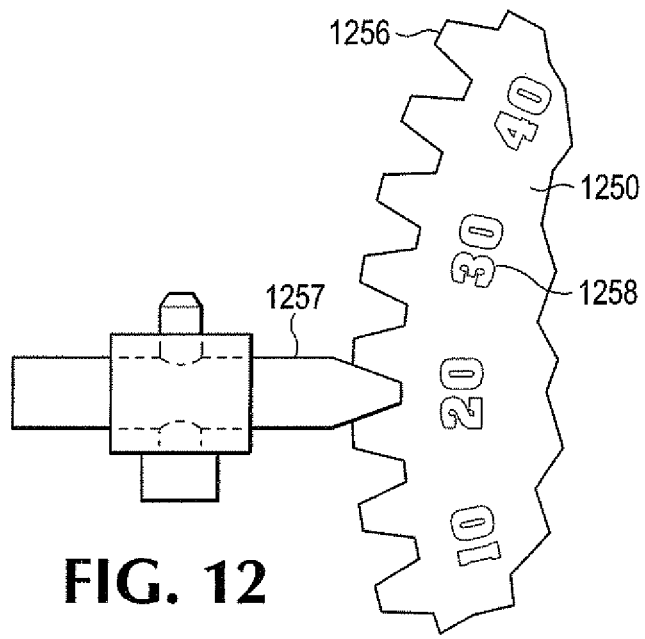
FIG. 12 is a detail diagram of an example roller track portion in a walking apparatus according to embodiments of the invention.

FIG. 12 is a detail diagram of an example roller track portion in a walking apparatus according to embodiments of the invention. Referring to FIG. 12, at least a portion of the plurality of gear teeth 1256 of the roller track 1250 are associated with indicator marks 1258. Here, the indictor marks 1258 are configured to identify the position of the roller track 1250 relative to the support foot 1150 (FIG. 11). In some embodiments, the indicator marks may include numbers, letters, or any other identifiable alpha-numeric symbols. In other embodiments, the indicator marks 1258 may include a dot, pit, bump, or other mark that can be counted. In some embodiments, the indicator marks 1258 may be associated with each position between gear teeth 1256, while in other embodiments, the indicator marks may appear only by every fifth gear tooth, or some other interval between gear teeth. As shown in FIG. 12, and steering dog or position lock 1257 may be used to fix the position of the roller track 1250 relative to the support foot. In some embodiments, all roller tracks 1250 of all walking machines used on job may be oriented in common manner at setup so that any steering movements needed during transport of the load can utilize common indicator values so that the roller tracks can be correctly positioned quickly.

Figure 13:
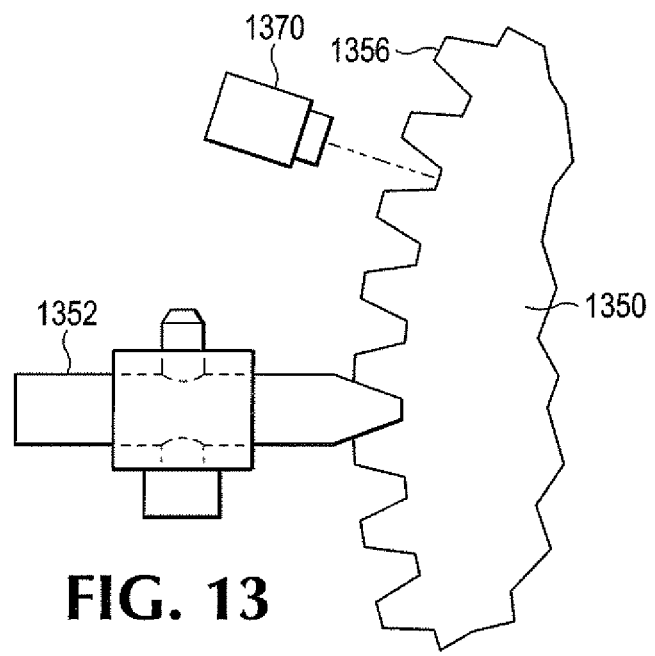
FIG. 13 is a detail diagram of another example roller track portion in a walking apparatus according to embodiments of the invention.

FIG. 13 is a detail diagram of another example roller track portion in a walking apparatus according to embodiments of the invention. Referring to FIG. 13, a walking apparatus may also include a position feedback sensor 1370 that is configured to detect the position of the roller track 1350 relative to the support foot. Here, the position feedback sensor 1370 may detect an actual position of the roller track 1350 or gears 1356, or may be used to detect relative movement between two positions (i.e., count the gears 1356 between a rotational movement of the roller track 1350). Again a locking mechanism 1352 may be used to lock the roller 1350 in place relative to the support foot.

The walking apparatuses can use a variety of ways to have the roller track moved relative to the support foot in order to steer the movement of a load. In some embodiments, an operator can manually move the roller track relative to the support foot to perform a steering movement. However, because of the size and weights involved with a typical application, some embodiments of the walking apparatus utilize a propulsion device that is configured to move the roller track relative to the support foot.

Figure 14:
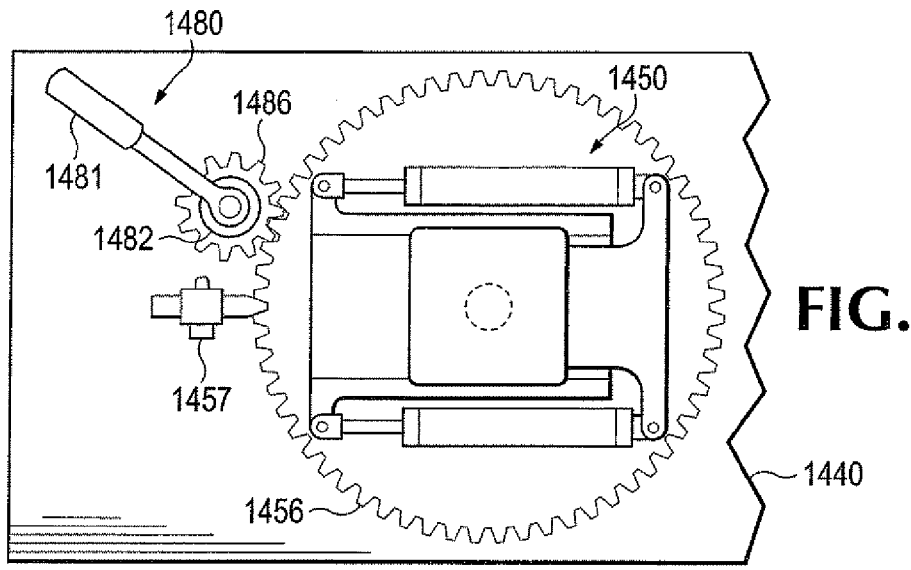
FIG. 14 is a detail diagram of a rotation device for use with a roller track in a walking apparatus according to embodiments of the invention.

FIG. 14 is a detail diagram of a rotation device for use with a roller track in a walking apparatus according to embodiments of the invention. Referring to FIG. 14, a walking apparatus includes a steering mechanism 1480 to rotate a roller track 1450 relative to a support foot 1440. The steering mechanism 1480 may include a rotatable gear 1486 configured to interface with the gear teeth 1456 along the bottom edge of the roller track 1450. The steering mechanism 1480 may also include an elongated handle 1481 so that an operator can turn the rotatable gear 1486 with relative ease. Additionally, in some embodiments, the steering mechanism 1480 may include a ratcheting mechanism 1482 so that a user only need operate the elongated handle 1481 over a limited distance. A locking mechanism 1457 may be used to lock the roller track 1450 in place once the desired orientation is reached.

Figure 15:
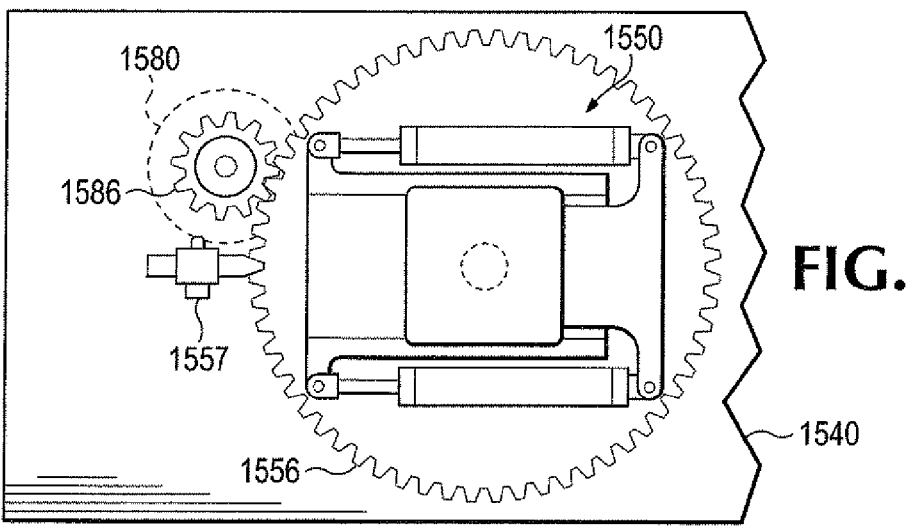
FIG. 15 is a detail diagram of another rotation device for use with a roller track in a walking apparatus according to embodiments of the invention.

FIG. 15 is a detail diagram of another rotation device for use with a roller track in a walking apparatus according to embodiments of the invention. Referring to FIG. 15, a walking apparatus includes a propulsion device 1580, such as a motor to rotate a roller track 1550 relative to a support foot 1540. The propulsion device 1580 may include a rotatable gear 1586 configured to interface with the gear teeth 1556 along the bottom edge of the roller track 1550. In some embodiments, the propulsion device 1580 may include a DC motor operated on batteries, or other direct current power supplies, while in other embodiments the propulsion device may include an AC motor operated from a generator or other types of alternating current power supplies. In other embodiments, a hydraulic motor or other types of electro/mechanical assistance devices may be used as the propulsion device 1580. An operator may be able to set a specific distance of travel for the motor (e.g., such as in embodiments where the motor is a stepper motor). Alternatively, the propulsion device 1580 may include a forward and backward cycles so that an operator can fine tune a position of the roller track 1550. In yet other embodiments, a position feedback sensor 1370 (FIG. 13) may be used to identify a position of the roller track 1550. Here, the operator may only have to type in an angular displacement between the roller track 1550 and the support foot 1540 and allow the motor 1580 and/or feedback sensor 1370 determine a correct position and move the roller track to that determined position. A locking mechanism 1557 may be used to lock the roller track 1550 in place once the desired orientation is reached.

Figure 16:
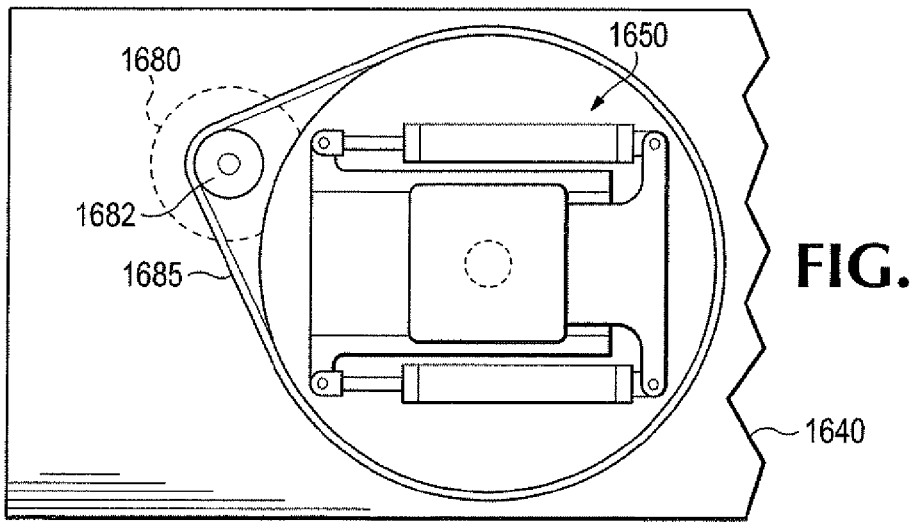
FIG. 16 is a detail diagram of another rotation device for use with a roller track in a walking apparatus according to embodiments of the invention.

FIG. 16 is a detail diagram of another rotation device for use with a roller track in a walking apparatus according to embodiments of the invention. Referring to FIG. 16, a roller track 1650 positioned on a support foot 1640 may not have gears associated with an edge portion. Here, the roller track is engaged to a drive pulley 1682 via a drive belt or chain 1685. The drive pulley 1682 may be connected to a motor 1680 or other propulsion device capable of rotating the drive pulley 1682.

In other embodiments, the roller track may not be substantially circular, and may be rotated or moved in other ways. The above embodiments merely provide exemplary variations in constructing a walking device according to the concepts of this invention.

Figure 17:
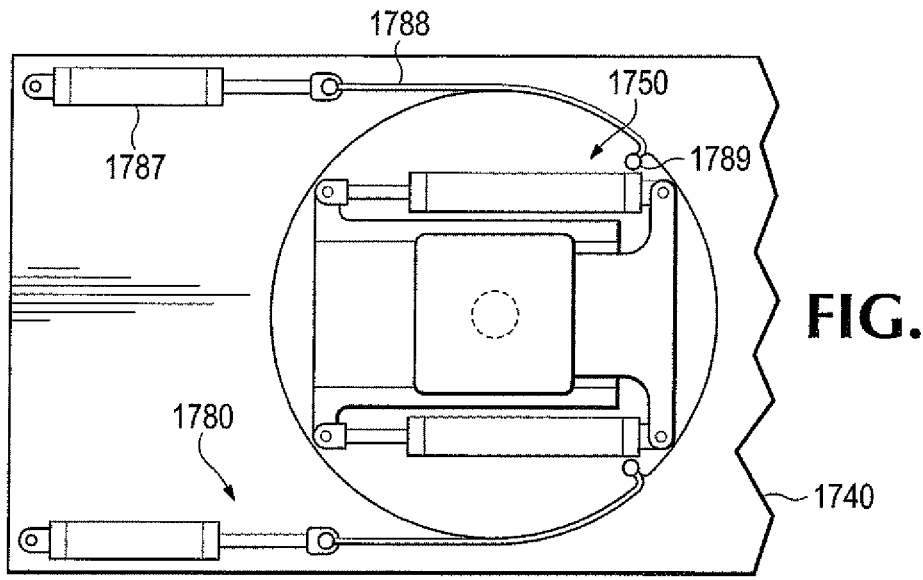
FIG. 17 is a detail diagram of another rotation device for use with a roller track in a walking apparatus according to embodiments of the invention.

FIG. 17 is a detail diagram of another rotation device for use with a roller track in a walking apparatus according to embodiments of the invention. Referring to FIG. 17, a roller track 1750 positioned on a support foot 1740 may use a cylinder propulsion system 1780 to rotate it relative to the support foot. Here, hydraulic or other cylinders 1787 are connected to attachment points 1789 on the edges of the roller track 1750 via cables 1788 or other connection devices. Depending on which cylinder 1787 is activated, the roller track 1750 will be rotated relative to the support foot 1740.

Figure 18:
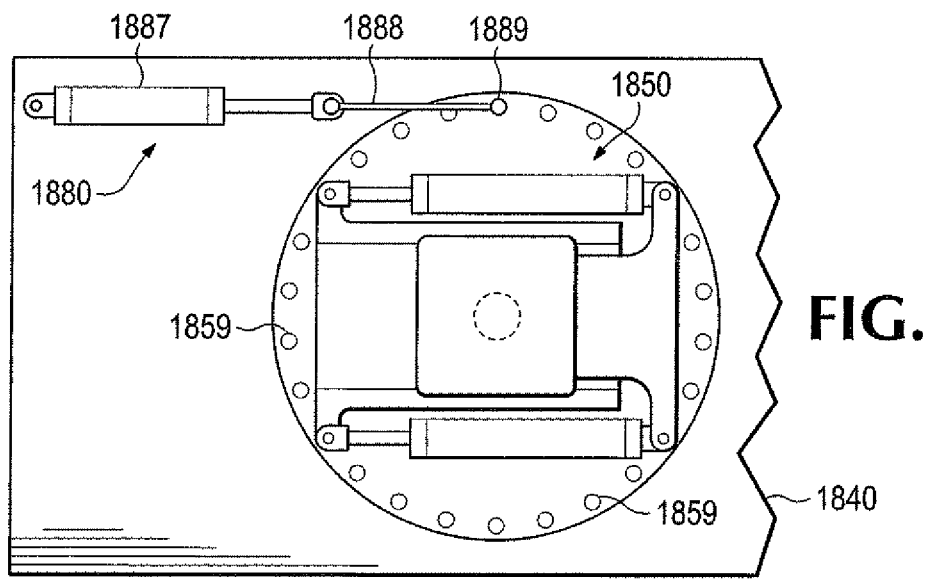
FIG. 18 is a detail diagram of another rotation device for use with a roller track in a walking apparatus according to embodiments of the invention.

FIG. 18 is a detail diagram of another rotation device for use with a roller track in a walking apparatus according to embodiments of the invention. Referring to FIG. 18, a roller track 1850 positioned on a support foot 1840 may use another type of cylinder propulsion system 1880 to rotate it relative to the support foot. Here, hydraulic or other cylinder 1887 is connected to one of multiple attachment points 1859 on the edges of the roller track 1850 via a cable or other type of link 1888 and pin connector 1889. In other embodiments, the cylinder 1887 may be directly connected to the pin connector 1889 to facilitate rotation of the roller track 1850 with respect to the support foot 1840. Here, the pin 1889 can be moved to a different attachment location 1859 and the cylinder activated to rotate the roller track 1850 in a desired direction relative to the support foot 1840.

In addition to being able to steer a load using the walking devices, use of pin connector can allow the orientation of a support foot to be maintained at a desired orientation during a movement cycle. Below are a few of the many example ways that the foot can be maintained in a desired orientation.

Figure 19:
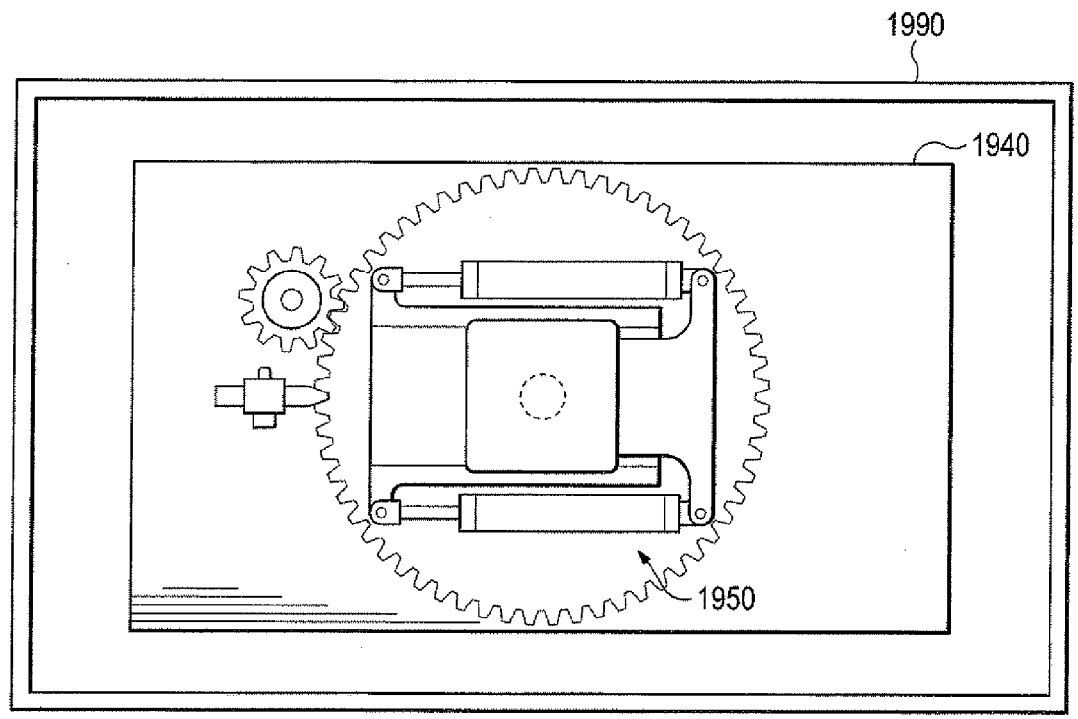
FIG. 19 is a detail diagram of an orientation device for use with a roller track in a walking apparatus according to embodiments of the invention.

FIG. 19 is a detail diagram of an orientation device for use with a roller track in a walking apparatus according to embodiments of the invention. Referring to FIG. 19, during movement of the walking device about the roller track 1950, a load can become offset from an orientation of the support foot 1940. In FIG. 19, a correction box frame 1990 is used to realign the support foot 1940 after a non-linear movement of the walking device. Here, as the edge of the support foot 1940 contacts the box frame 1990 it is pushed into orthogonal alignment with the box based on its offset edge creating a torsional moment about the rotation pin 655 (FIG. 6) and rotating the support foot 1940 back into alignment.

Figure 20:
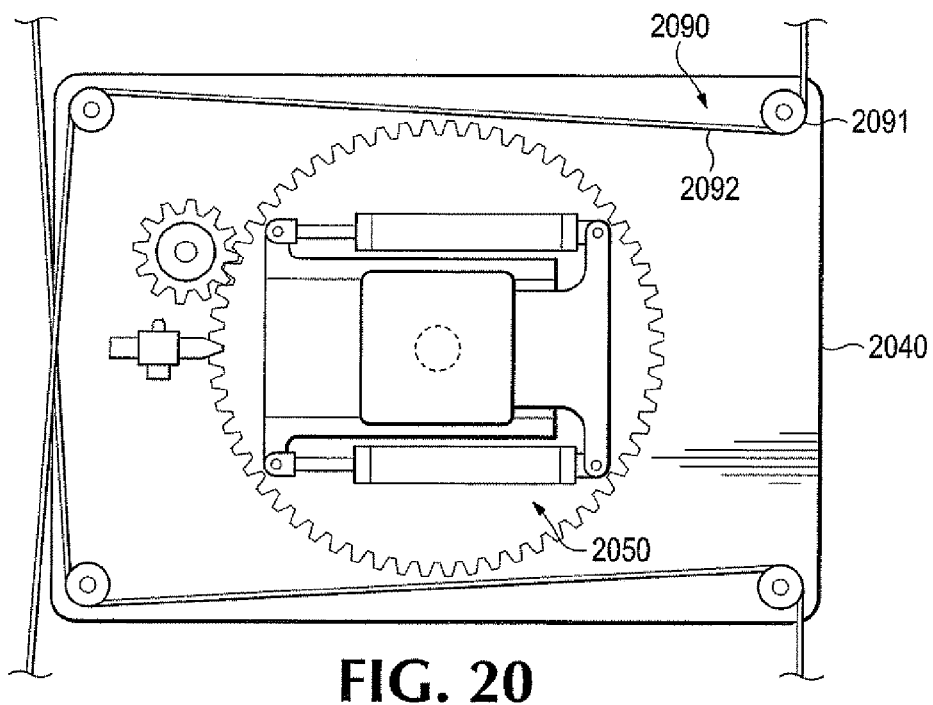
FIG. 20 is a detail diagram of another orientation device for use with a roller track in a walking apparatus according to embodiments of the invention.

FIG. 20 is a detail diagram of another orientation device for use with a roller track in a walking apparatus according to embodiments of the invention. Referring to FIG. 20, a support foot 2040 is brought back into alignment after a movement cycle by a cable tensioning system 2090 that uses cables 2092 and pulleys 2091 attached to a frame (not shown) that creates the tension needed during a move that when the support foot 2040 is raised above the ground, the support foot will be pulled back into alignment with the load. As the support foot 2040 is connected to the roller track 2050 via a rotational pin 655, it does not need to rotate with the roller track.

Figure 21:
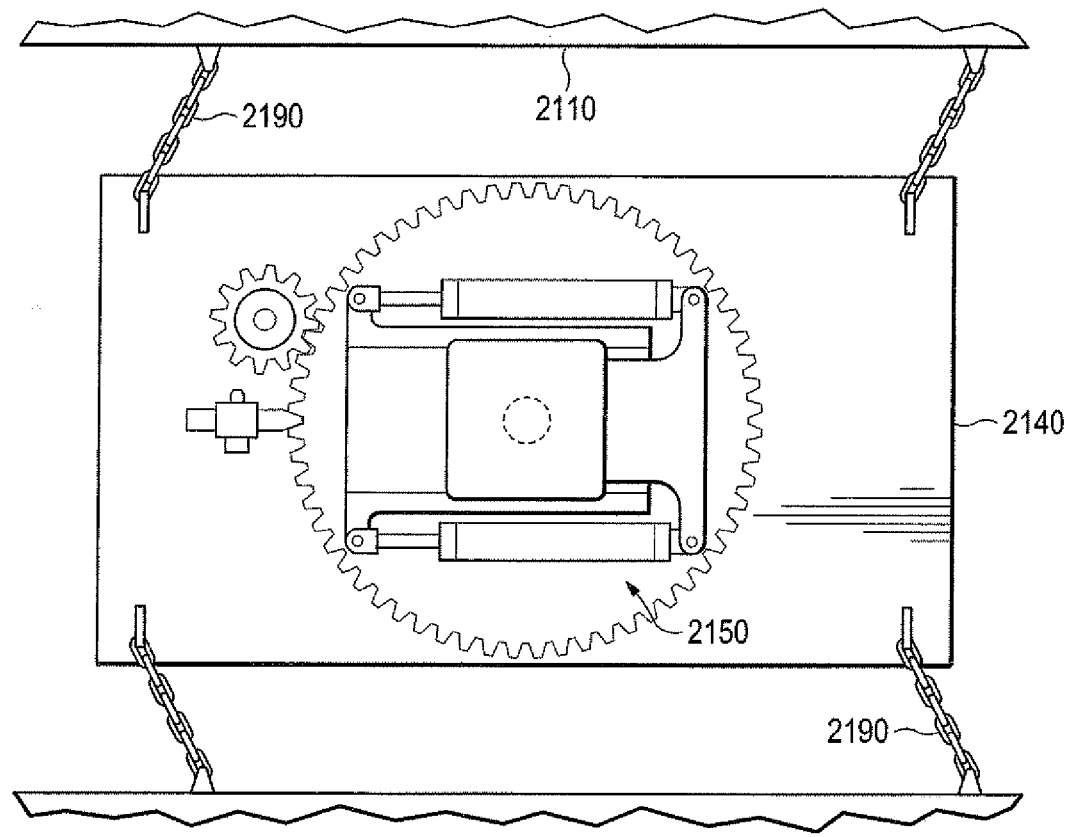
FIG. 21 is a detail diagram of another orientation device for use with a roller track in a walking apparatus according to embodiments of the invention.

FIG. 21 is a detail diagram of another orientation device for use with a roller track in a walking apparatus according to embodiments of the invention. Referring to FIG. 21, another embodiment of reorienting the support foot 2140 is shown. In this embodiment chains or other restricting mechanisms 2190 are used to create unbalanced forces when the support foot is misaligned with the frame 2110 of a load. Again, as the support foot 2140 is connected to the roller track 2150 via a rotational pin 655, it does not need to rotate with the roller track.

Figure 22:
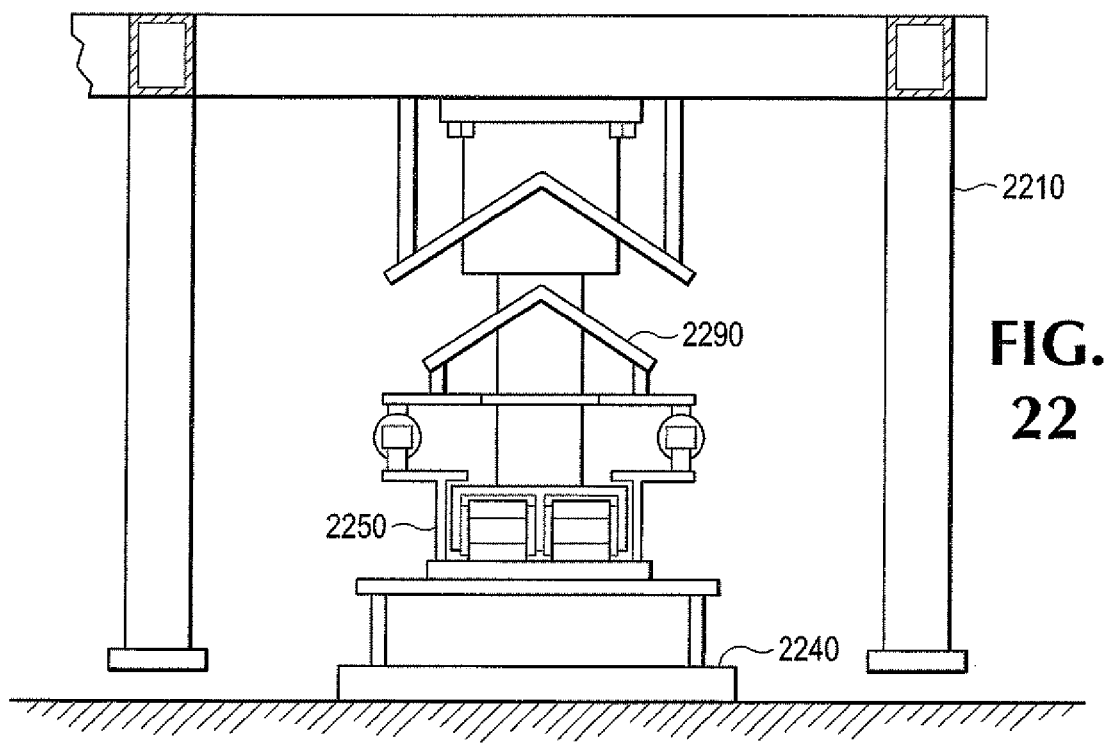
FIG. 22 is a detail diagram of another orientation device for use with a roller track in a walking apparatus according to embodiments of the invention.

FIG. 22 is a detail diagram of another orientation device for use with a roller track in a walking apparatus according to embodiments of the invention. Referring to FIG. 22, another alignment embodiment is shown. Here, the support foot 2240 can be realigned with a frame 2210 using an angle guide 2290 attached above a roller track 2250. When the support foot 2240 becomes misaligned during a movement cycle, and the support foot is lifted above the ground, the angle guide 2290 will push the support foot back into alignment.

Figure 23:
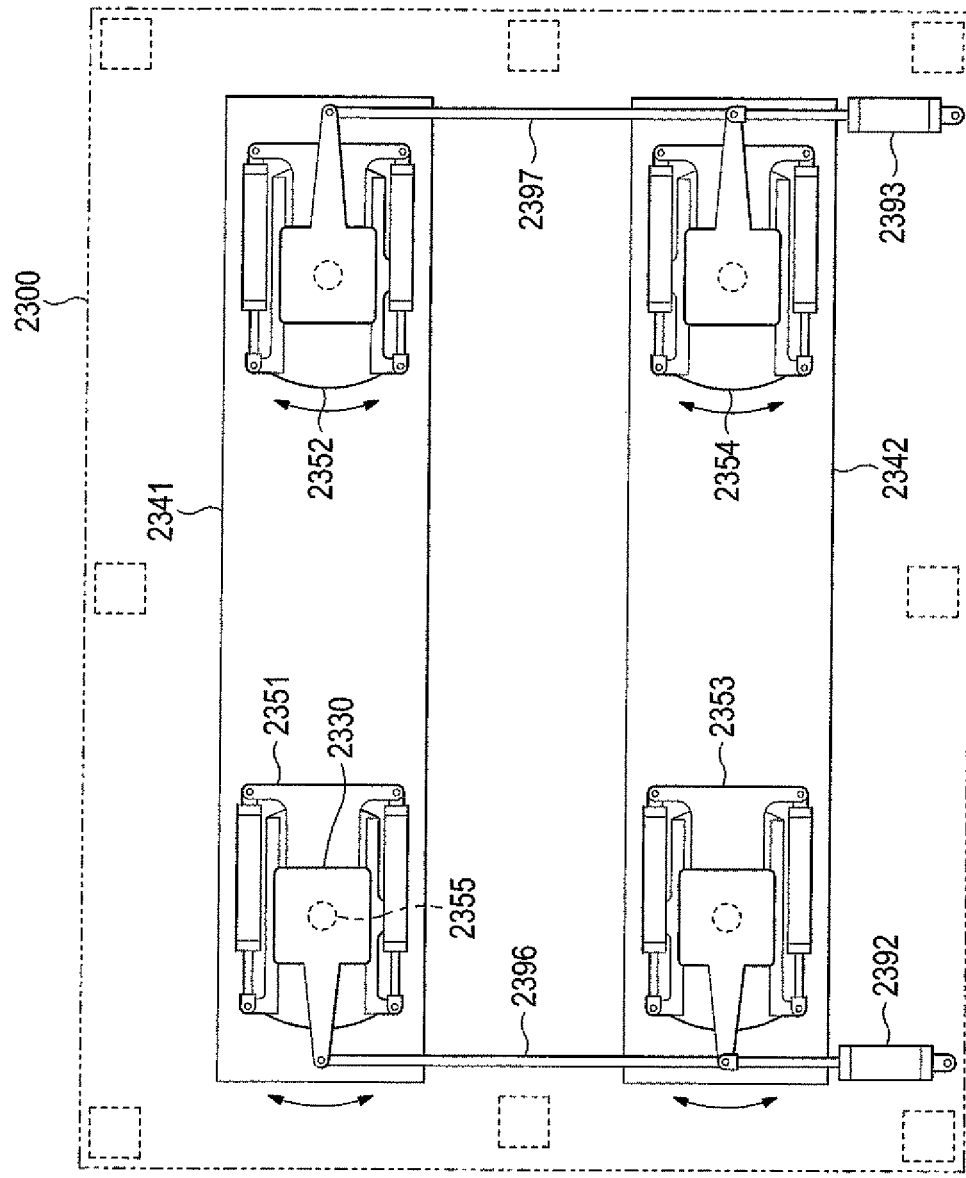
FIG. 23 is a detail diagram of a linking system used to steer roller tracks of multiple walking apparatus according to embodiments of the invention.

FIG. 23 is a detail diagram of a linking system used to steer roller tracks of multiple walking apparatus according to embodiments of the invention. Referring to FIG. 23, a linking system is used to steer multiple walking devices together in transporting a load 2300. Here, the linking system includes a cylinder (hydraulic or otherwise) 2392 and 2393 connected to two or more walking machines 2351, 2353 and 2352, 2354, respectively, via connecting rods 2396 and 2397, respectively. Here, the cylinders 2392, 2393 can be activated to rotate the connected ones of the walking machines in a desired direction. Although multiple walking devices are positioned on common support feet 2341, 2342 in this embodiment, the walking devices on each common support foot do not necessarily have to be connected to the same connecting rod 2396, 2397. This is so more steering modes can be utilized such as spin-steering etc. where walking device connected to the same support foot can be oriented in different directions.

Figure 24:
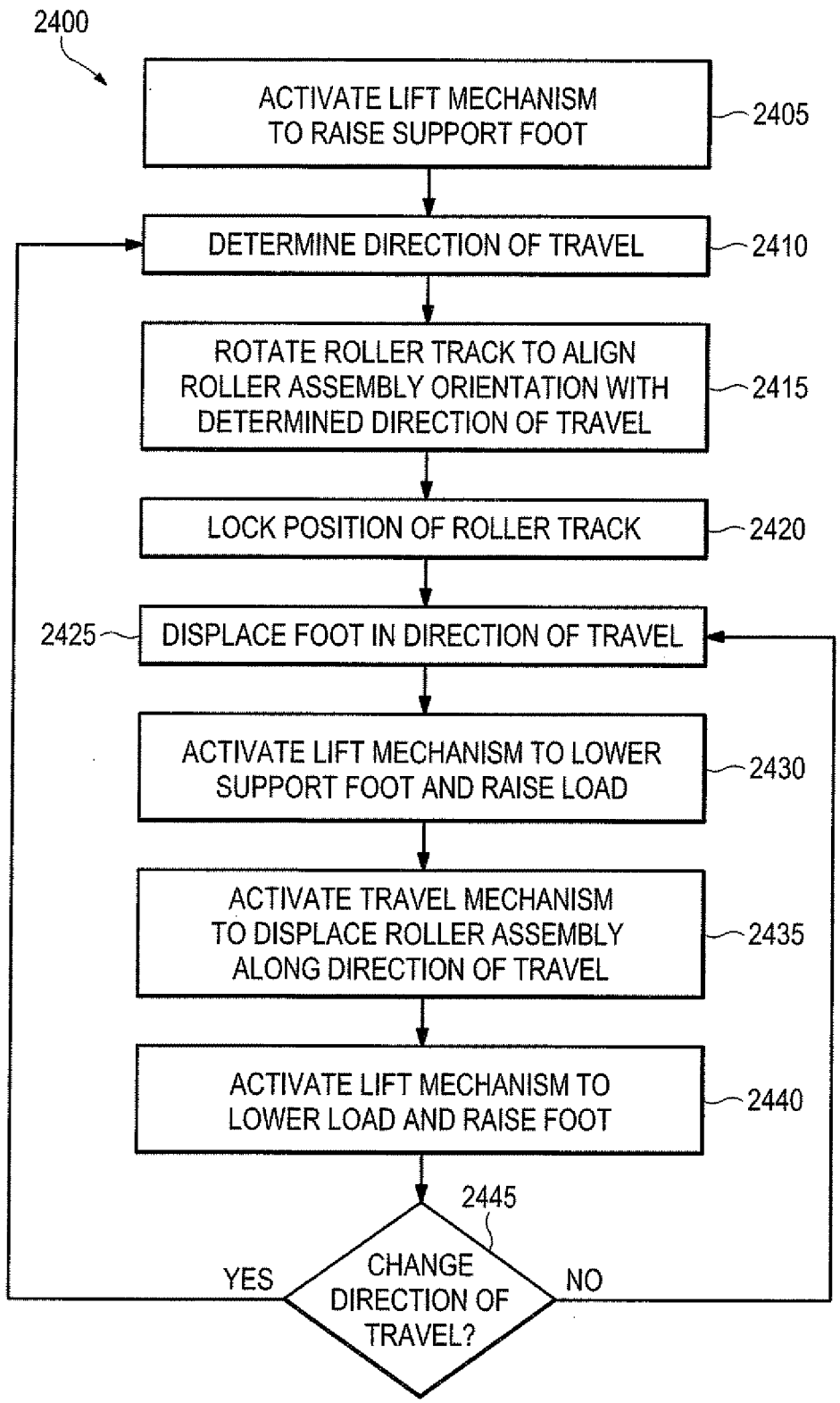
FIG. 24 is a flow diagram illustrating processes used to operate a walking apparatus according to embodiments of the invention.

FIG. 24 is a flow diagram illustrating processes used to operate a walking apparatus according to embodiments of the invention. Referring to FIG. 24, a flow 2400 begins with a first process 2405 where a lift mechanism is activated to raise the support foot. Flow 2400 then proceeds to process 2410 where a direction of travel is determined. The roller track is then rotated in process 2415 to align the roller assembly orientation with the determined direction of travel. The position of the roller track is locked in process 2420 and the foot is displaced in the direction of travel in process 2425. The lift mechanism is activated to lower the support foot and raise the load in process 2430. In process 2435 the travel mechanism is activated to displace the roller assembly along the direction of travel. The lift mechanism is activated in process 2440 to lower the load and raise the foot. It is then determined if the direction of travel needs to be changed for the next movement in process 2445. If it does not need to be changed, flow 2400 returns to process 2425 where the foot is again displaced in the direction in travel. Alternatively, when it is determined that the direction of travel does need to be changed in process 2445, flow 2400 returns to process 2410 where the new direction of travel is determined.

In another example embodiment, a method of steering a load transporting device connected to a load-bearing frame supporting a load is provided. Here, the load transporting device includes a lift mechanism structured to lift the load-bearing frame, a roller assembly coupled to the lift mechanism and configured to move over a roller track in a first direction by being manipulated by a travel mechanism, and a support foot connected to the roller track with a pin connector. The method includes activating the lift mechanism to raise the support foot off of the ground surface, determining a direction of travel of the load, and rotating the roller track relative to the support foot, where the roller track rotated to align the first direction with the direction of travel. Afterwards, the method includes locking the position of the roller track relative to the support foot, activating the lift mechanism to lower the support foot to the ground surface and raising the load supported by the frame, and activating the travel mechanism to displace the roller assembly in the first direction.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein.

The invention claimed is:

1. An apparatus comprising:
a lift mechanism configured to lift a load-bearing frame;
a roller assembly operably coupled to the lift mechanism;
a support foot positioned below the roller assembly;
a roller track configured to guide the roller assembly; and
a pin connector operably coupling the support foot to the roller track and configured to allow the roller track to rotate about a substantially vertical axis of rotation provided by the pin connector, wherein the roller track is configured to rotate relative to the support foot from a first rotated position associated with a first direction of travel of the roller assembly to a second rotated position associated with a second direction of travel of the roller assembly different than the first direction of travel, and wherein the pin connector comprises a bearing that is rotatable about a single axis in one degree of freedom.

2. The apparatus of claim 1, further comprising a travel mechanism configured to displace the roller assembly relative to the support foot.

3. The apparatus of claim 2, wherein the travel mechanism is operably coupled to the roller assembly.

4. The apparatus of claim 3, wherein the travel mechanism is further operably coupled to the roller track.

5. The apparatus of claim 1, wherein the travel mechanism comprises two travel cylinders mounted on opposite sides of the roller track.

6. The apparatus of claim 1, further comprising a locking device configured to lock the roller track in one or both of the first rotated position and the second rotated position relative to the support foot.

7. The apparatus of claim 1, wherein the support foot is configured to contact a base surface that supports a weight of the load-bearing frame, and wherein the substantially vertical axis of rotation provided by the pin connector is oriented in a substantially vertical direction with respect to the base surface.

8. The apparatus of claim 1, wherein a rotation of the roller track about the substantially vertical axis of rotation provided by the pin connector is associated with a steering operation of the load-bearing frame from the first direction of travel to the second direction of travel.

9. An apparatus, comprising:
means for moving a roller assembly relative to a roller track, wherein the roller track is located in a first rotational position relative to a support foot, and wherein the movement of the roller assembly relative to the roller track located in the first rotational position displaces a load transporting device in a first direction of travel; and
means for rotating the roller track to a second rotational position relative to the support foot, wherein the roller track is operably coupled to the support foot by a connecting pin, wherein the means for moving is further configured to move the roller assembly relative to the roller track located in the second rotational position, and wherein the movement of the roller assembly relative to the roller track located in the second rotational position displaces the load transporting device in a second direction of travel different than the first direction of travel.

10. The apparatus of claim 9, further comprising means for displacing the roller assembly relative to the support foot.

11. The apparatus of claim 10, wherein the means for displacing is operably coupled to the roller assembly.

12. The apparatus of claim 10, wherein the means for displacing is operably coupled to the roller track.

13. The apparatus of claim 10, further comprising means for raising and lowering the support foot off of a transport surface, wherein the support foot is raised off of the transport surface prior to rotating the roller track to the second rotational position, and wherein the means for moving is configured to move the roller assembly relative to the roller track located in the second rotational position with the support foot lowered to the transport surface.

14. The apparatus of claim 9, further comprising means for biasing the support foot to an aligned position relative to the load-bearing frame during a recovery phase, wherein the means for biasing is configured to become activated during a load-movement phase.

15. The apparatus of claim 14, wherein the load-movement phase comprises movement of the roller assembly in a direction that is angularly displaced from a longitudinal centerline of the support foot, and wherein in response to the movement of the roller assembly, a torquing force is applied to the means for biasing.

16. The apparatus of claim 9, further comprising means for locking the roller track in the first rotational position relative to the support foot.

17. A method of steering a load transporting device comprising:
moving a roller assembly relative to a roller track, wherein the roller track is located in a first rotational position relative to a support foot, and wherein the movement of the roller assembly relative to the roller track located in the first rotational position displaces the load transporting device in a first direction of travel;

rotating the roller track to a second rotational position relative to the support foot, wherein the roller track is operably coupled to the support foot by a connecting pin; and moving the roller assembly relative to the roller track located in the second rotational position, wherein the movement of the roller assembly relative to the roller track located in the second rotational position displaces the load transporting device in a second direction of travel different than the first direction of travel.

18. The method of claim 17, wherein the roller assembly is moved by a travel mechanism operably coupled to both the roller track and the roller assembly.

19. The method of claim 17, further comprising locking the roller track relative to the support foot prior to moving the roller assembly relative to the roller track in the second rotational position.

20. The method of claim 17, further comprising:
raising the support foot off of a transport surface prior to rotating the roller track; and
lowering the support foot to the transport surface after rotating the roller track.

21. The method of claim 20, wherein the support foot is raised and lowered by a lift mechanism, and wherein the roller assembly is operably coupled to the lift mechanism.

22. The method of claim 17, wherein the roller track is rotated about a substantially vertical axis of rotation provided by the connecting pin.

* * * * *